United States Patent
Kamiya et al.

(10) Patent No.: US 11,454,965 B2
(45) Date of Patent: Sep. 27, 2022

(54) REMOTE CONTROL SYSTEM FOR INDUSTRIAL VEHICLES, INDUSTRIAL VEHICLE, REMOTE CONTROL DEVICE, REMOTE CONTROL PROGRAM FOR INDUSTRIAL VEHICLES, AND REMOTE CONTROL METHOD FOR INDUSTRIAL VEHICLES

(71) Applicant: KABUSHIKI KAISHA TOYOTA JIDOSHOKKI, Kariya (JP)

(72) Inventors: Tomonori Kamiya, Kariya (JP); Koji Hika, Kariya (JP); Hironobu Okamoto, Kariya (JP); Nobutoshi Kajiya, Kariya (JP); Shinya Goto, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 411 days.

(21) Appl. No.: 16/482,489

(22) PCT Filed: Jan. 23, 2018

(86) PCT No.: PCT/JP2018/001843
§ 371 (c)(1),
(2) Date: Jul. 31, 2019

(87) PCT Pub. No.: WO2018/142992
PCT Pub. Date: Aug. 9, 2018

(65) Prior Publication Data
US 2020/0012274 A1 Jan. 9, 2020

(30) Foreign Application Priority Data

Feb. 2, 2017 (JP) .............. JP2017-017595
Jul. 7, 2017 (JP) .............. JP2017-133751

(51) Int. Cl.
*G05D 1/00* (2006.01)
*H01Q 1/27* (2006.01)
(Continued)

(52) U.S. Cl.
CPC ......... *G05D 1/0022* (2013.01); *B66F 9/0755* (2013.01); *B66F 9/07581* (2013.01);
(Continued)

(58) Field of Classification Search
CPC .......... G05D 1/0022; G05D 2201/0216; B66F 9/0755; B66F 9/07581; B66F 9/24; G08C 17/02; G08C 2201/91; H01Q 1/27
See application file for complete search history.

(56) References Cited

U.S. PATENT DOCUMENTS

| | | | |
|---|---|---|---|
| 2005/0042068 A1* | 2/2005 | Ehmen | B66F 9/10 414/661 |
| 2007/0129869 A1* | 6/2007 | Gudat | G05D 1/0297 701/50 |
| 2008/0292448 A1* | 11/2008 | Keenan | B66F 9/07563 414/812 |

(Continued)

FOREIGN PATENT DOCUMENTS

| | | |
|---|---|---|
| JP | 02-162928 A | 6/1990 |
| JP | 2002-104800 A | 4/2002 |

(Continued)

OTHER PUBLICATIONS

International Search Report for PCT/JP2018/001843 dated Apr. 3, 2018 [PCT/ISA/210].

*Primary Examiner* — Thomas D Alunkal
(74) *Attorney, Agent, or Firm* — Sughrue Mion, PLLC

(57) ABSTRACT

An industrial vehicle remote control system includes a forklift that has a vehicle communication unit and a remote control device that has a remote communication unit and is used to remotely control the forklift. A vehicle wireless CPU (Continued)

of the industrial vehicle remote control system acquires the received radio wave intensity of a remote control signal by which the two communication units wirelessly communicate, and, on the basis of the results thereof, determines whether the forklift is positioned in a permission range or in a prohibition range.

23 Claims, 18 Drawing Sheets

(51) Int. Cl.
G08C 17/02 (2006.01)
B66F 9/24 (2006.01)
B66F 9/075 (2006.01)

(52) U.S. Cl.
CPC ............ *B66F 9/24* (2013.01); *G08C 17/02* (2013.01); *H01Q 1/27* (2013.01); *G05D 2201/0216* (2013.01); *G08C 2201/91* (2013.01)

(56) References Cited

U.S. PATENT DOCUMENTS

| | | | | |
|---|---|---|---|---|
| 2010/0044332 | A1* | 2/2010 | Cameron | B66C 15/065 212/278 |
| 2011/0052354 | A1* | 3/2011 | McGrane | B66F 9/07563 414/373 |
| 2014/0056673 | A1* | 2/2014 | Zindel | B65D 88/28 414/288 |
| 2014/0311113 | A1* | 10/2014 | Bonefas | A01D 75/02 56/10.2 R |
| 2016/0031683 | A1* | 2/2016 | Fen | B66C 13/40 212/276 |
| 2017/0055432 | A1* | 3/2017 | Graham | A01C 21/005 |
| 2017/0168501 | A1* | 6/2017 | Ogura | G05D 1/0278 |

FOREIGN PATENT DOCUMENTS

| | | |
|---|---|---|
| JP | 2009-109038 A | 5/2009 |
| JP | 3179822 U | 11/2012 |
| JP | 2013-013336 A | 1/2013 |
| WO | 2017036750 A1 | 3/2017 |

* cited by examiner

Fig.4
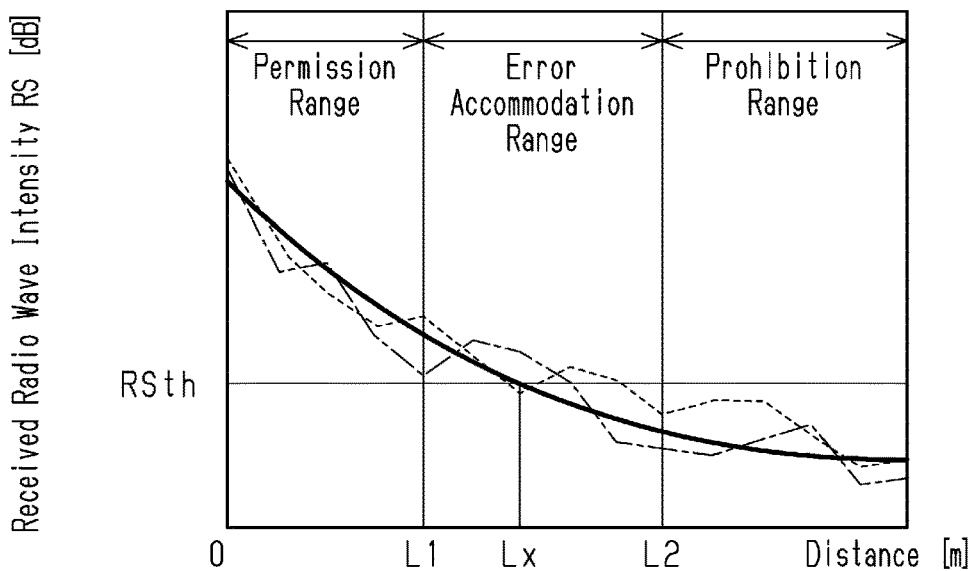
Fig.5
| Remote Control Mode | Assumed Forklift Position | Remote Control Relating to Traveling |
|---|---|---|
| Initial Mode | Indefinite | Prohibited |
| Permission Mode | Permission Range | Permitted |
| Warning Mode | Permission Range → Prohibition Range | Permitted |
| Prohibition Mode | Prohibition Range | Prohibited |
Fig.6
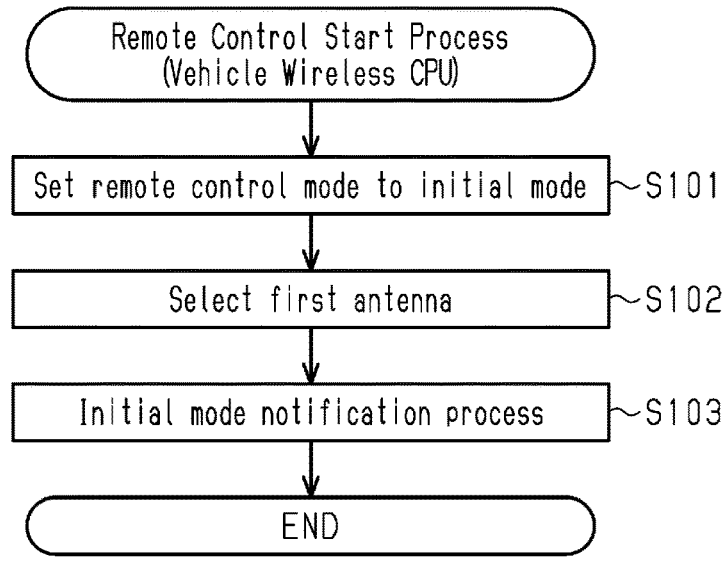

| Remote Control Mode | Mode Threshold |
|---|---|
| Initial Mode | RStha |
| Permission Mode | RSthb |
| Warning Mode | RSthc |
| Prohibition Mode | RSthd |

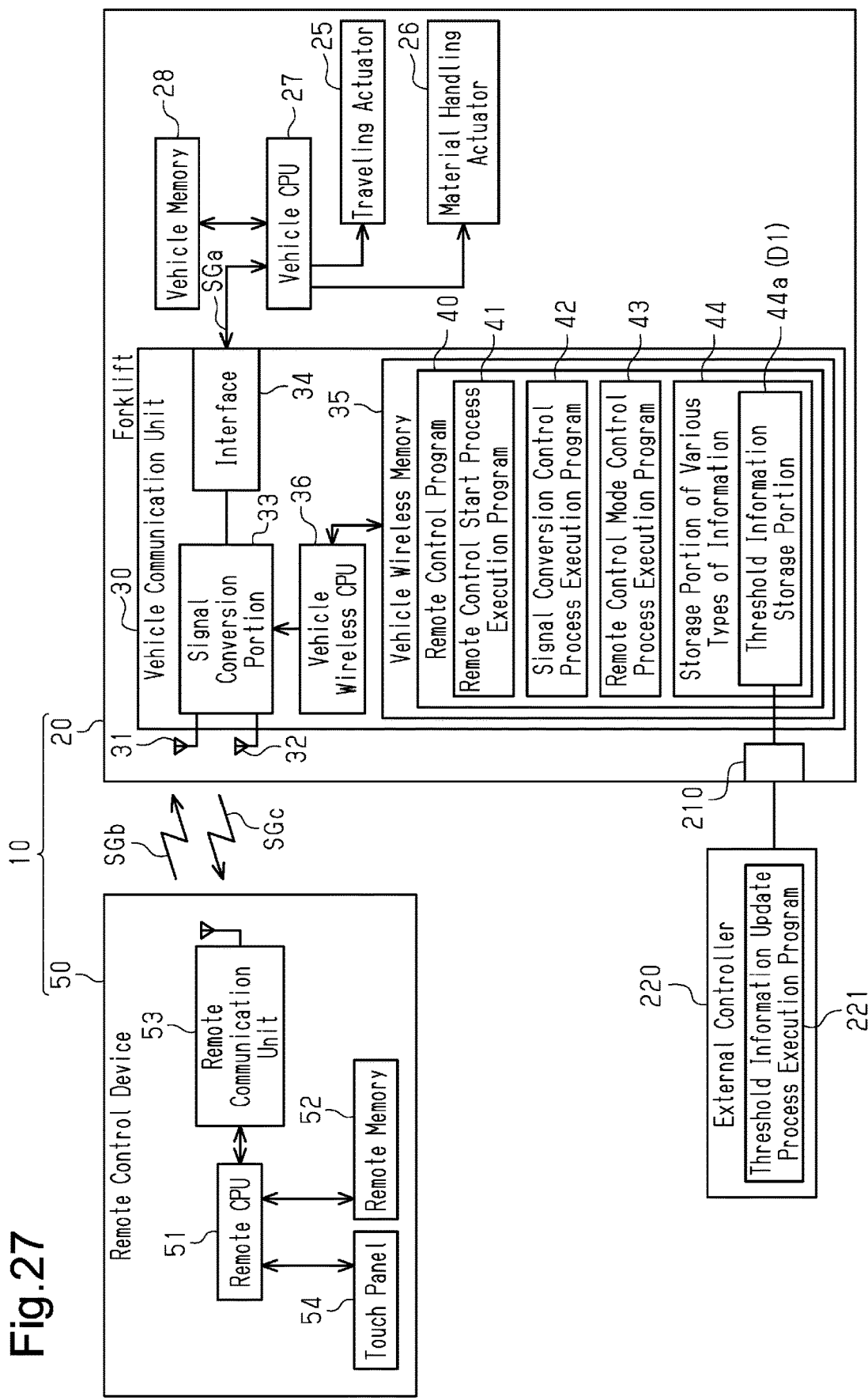

REMOTE CONTROL SYSTEM FOR INDUSTRIAL VEHICLES, INDUSTRIAL VEHICLE, REMOTE CONTROL DEVICE, REMOTE CONTROL PROGRAM FOR INDUSTRIAL VEHICLES, AND REMOTE CONTROL METHOD FOR INDUSTRIAL VEHICLES

CROSS REFERENCE TO RELATED APPLICATIONS

This application is a National Stage of International Application No. PCT/JP2018/001843 filed Jan. 23, 2018, claiming priorities based on Japan Patent Application No. 2017-017595 filed Feb. 2, 2017 and 2017-133751 filed Jul. 7, 2017, the contents of these applications are incorporated herein by reference.

TECHNICAL FIELD

The present invention relates to an industrial vehicle remote control system, an industrial vehicle, a remote control device, a industrial vehicle remote control program, and an industrial vehicle remote control method.

BACKGROUND ART

Patent Document 1 describes a remote controller, which functions as a remote control device used for remote control of a forklift. This document describes remotely operating the material handling of the forklift from a position separated from the forklift.

The industrial vehicle and the remote control device may communicate wirelessly with each other. Depending on their wireless communication range, remote control relating to traveling may be possible at a position excessively far from the appropriate region in which the operator can clearly see the industrial vehicle. This may cause a problem such as an error in remote control relating to traveling of the industrial vehicle.

PRIOR ART DOCUMENT

Patent Document

Patent Document 1: Japanese Laid-Open Patent Publication No. 2002-104800

SUMMARY OF THE INVENTION

Problems that the Invention is to Solve

It is an objective of the present invention to provide an industrial vehicle remote control system, an industrial vehicle, a remote control device, a industrial vehicle remote control program, and an industrial vehicle remote control method that limit remote control relating to traveling of an industrial vehicle performed using a remote control device by an operator who is excessively far from the industrial vehicle.

Means for Solving the Problems

To achieve the foregoing objective and in accordance with a first aspect of the present invention, an industrial vehicle remote control system is provided that includes an industrial vehicle including a vehicle communication portion, a remote control device that includes a control device communication portion, which communicates wirelessly with the vehicle communication portion, and is used to remotely control the industrial vehicle, an acquisition portion configured to acquire a received radio wave intensity of a signal communicated wirelessly between the vehicle communication portion and the control device communication portion, and a possibility determination portion configured to perform possibility determination that: determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period; and determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period. The prohibition range is a range in which remote control relating to traveling of the industrial vehicle using the remote control device is prohibited even under conditions where wireless communication between the vehicle communication portion and the control device communication portion is performed.

To achieve the foregoing objective and in accordance with a second aspect of the present invention, an industrial vehicle that is remotely controlled by a remote control device that includes a control device communication portion is provided. The industrial vehicle includes a vehicle communication portion, which communicates wirelessly with the control device communication portion, an acquisition portion configured to acquire a received radio wave intensity of a signal received by the vehicle communication portion, and a possibility determination portion configured to perform possibility determination that: determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period; and determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period. The prohibition range is a range in which remote control relating to traveling of the industrial vehicle using the remote control device is prohibited even under conditions where wireless communication between the vehicle communication portion and the control device communication portion is performed.

To achieve the foregoing objective and in accordance with a third aspect of the present invention, a remote control device used to remotely control an industrial vehicle that includes a vehicle communication portion is provided. The remote control device includes a control device communication portion, which communicates wirelessly with the vehicle communication portion, an acquisition portion configured to acquire a received radio wave intensity of a signal received by the control device communication portion, and a possibility determination portion configured to perform possibility determination that: determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period; and determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period. The prohibition range is a range in which remote control relating to traveling of the industrial vehicle using the remote control device is prohibited even under conditions where wireless communication between the vehicle communication portion and the control device communication portion is performed.

To achieve the foregoing objective and in accordance with a fourth aspect of the present invention, an industrial vehicle remote control program is provided that is used to remotely control an industrial vehicle that includes a vehicle communication portion by using a remote control device that includes a control device communication portion, which communicates wirelessly with the vehicle communication portion. The industrial vehicle remote control program causes the industrial vehicle or the remote control device to function as: an acquisition portion configured to acquire a received radio wave intensity of a signal communicated wirelessly between the vehicle communication portion and the control device communication portion; and a possibility determination portion configured to perform possibility determination that: determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period; and determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period. The prohibition range is a range in which remote control relating to traveling of the industrial vehicle using the remote control device is prohibited even under conditions where wireless communication between the vehicle communication portion and the control device communication portion is performed.

To achieve the foregoing objective and in accordance with a fifth aspect of the present invention, an industrial vehicle remote control method is provided that is used to remotely control an industrial vehicle including a vehicle communication portion by using a remote control device that includes a control device communication portion, which communicates wirelessly with the vehicle communication portion. The method includes: an acquisition step for acquiring a received radio wave intensity of a signal communicated wirelessly between the vehicle communication portion and the control device communication portion; and a possibility determination step for performing possibility determination that: determines that the industrial vehicle is in a permission range, in which remote control relating to traveling of the industrial vehicle using the remote control device is permitted, when a state in which the received radio wave intensity acquired by the acquisition step is greater than or equal to a predetermined first threshold intensity continues for a predetermined first determination period; and determines that the industrial vehicle is in a prohibition range, which is farther from the remote control device than the permission range, when a state in which the received radio wave intensity acquired by the acquisition step is less than a second threshold intensity, which is less than or equal to the first threshold intensity, continues for a predetermined second determination period. The prohibition range is a range in which remote control relating to traveling of the industrial vehicle using the remote control device is prohibited even under conditions where wireless communication between the vehicle communication portion and the control device communication portion is performed.

To achieve the foregoing objective and in accordance with a sixth aspect of the present invention, an industrial vehicle remote control system is provided that includes an industrial vehicle, a remote control device, an acquisition portion, a possibility determination portion, a remote control mode control portion, and an indication portion. The industrial vehicle includes a vehicle communication portion. The remote control device includes a control device communication portion, which communicates wirelessly with the vehicle communication portion, and is used to remotely control the industrial vehicle. Remote control modes relating to traveling of the industrial vehicle using the remote control device include: a permission mode and a suspension mode that permit remote control relating to traveling of the industrial vehicle using the remote control device; and a prohibition mode that prohibits remote control relating to traveling of the industrial vehicle using the remote control device even under conditions where wireless communication between the vehicle communication portion and the control device communication portion is performed. The acquisition portion is configured to acquire a physical amount relating to a distance between the vehicle communication portion and the control device communication portion. The possibility determination portion is configured to perform possibility determination that determines, based on the physical amount acquired by the acquisition portion, whether the industrial vehicle is in a first range or in a second range, which is farther from the remote control device than the first range. The remote control mode control portion is configured to switch the remote control mode from the permission mode to the suspension mode when the industrial vehicle is determined to be in the second range in the possibility determination performed while the remote control mode is the permission mode. The indication portion configured to indicate the remote control mode. The remote control mode control portion switches the remote control mode from the suspension mode to the permission mode when a predetermined permission mode transition condition is satisfied while the remote control mode is the suspension mode, and switches the remote control mode from the suspension mode to the prohibition mode when a predetermined suspension period has elapsed without the permission mode transition condition being satisfied since the remote control mode is switched from the permission mode to the suspension mode.

To achieve the foregoing objective and in accordance with a seventh aspect of the present invention, an industrial vehicle remote control system is provided that includes an industrial vehicle including a vehicle communication portion, a remote control device that includes a control device communication portion, which communicates wirelessly with the vehicle communication portion, and is used to remotely control the industrial vehicle, an acquisition portion configured to acquire a received radio wave intensity of a signal communicated wirelessly between the vehicle communication portion and the control device communication portion, a storage portion that stores threshold information relating to a threshold intensity, which is a threshold of the received radio wave intensity, and a possibility determination portion configured to perform possibility determination that determines whether the industrial vehicle is in a permission range, in which remote control relating to traveling of the industrial vehicle using the remote control device is permitted, or in a prohibition range, which is farther from the remote control device than the permission range, based on comparison between the received radio wave intensity acquired by the acquisition portion and the threshold intensity set in the threshold information. The prohibition range is a range in which remote control relating to traveling of the industrial vehicle using the remote control device is prohibited even under conditions where wireless communication between the vehicle communication portion and the control device communication portion is performed. The threshold information is updated when a predetermined update condition is satisfied.

BRIEF DESCRIPTION OF THE DRAWINGS

FIG. 4 is a graph showing the relationship between the received radio wave intensity and the distance.

FIG. 5 is a diagram for illustrating remote control modes.

FIG. 6 is a flowchart showing a remote control start process.

FIG. 27 is a block diagram showing the electrical configuration of an industrial vehicle remote control system of a modification.

MODES FOR CARRYING OUT THE INVENTION

First Embodiment

A first embodiment of an industrial vehicle remote control system is now described. For illustration purposes, FIG. 2 and other drawings show ranges A0 to A3 in sizes that differ from the actual sizes.

Figure 1:
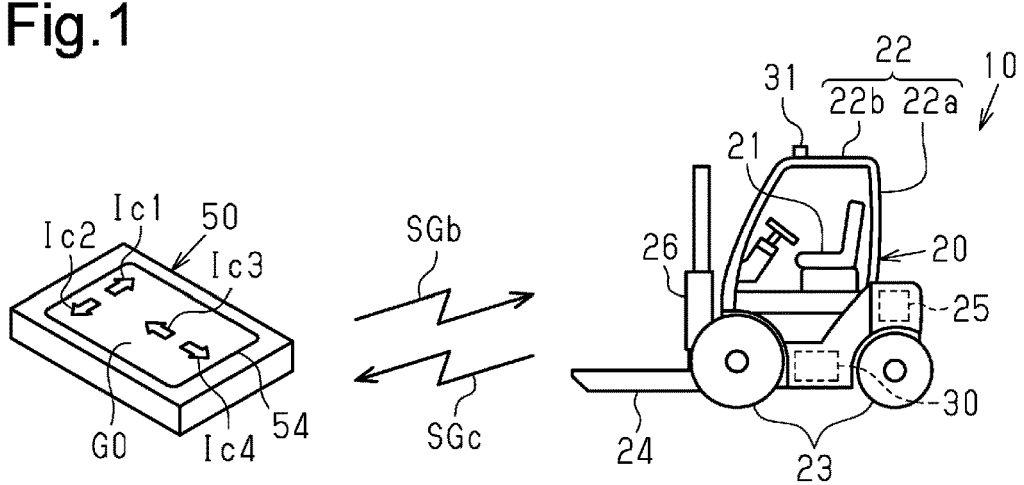
FIG. 1 is a schematic diagram showing an industrial vehicle remote control system.
Figure 2:
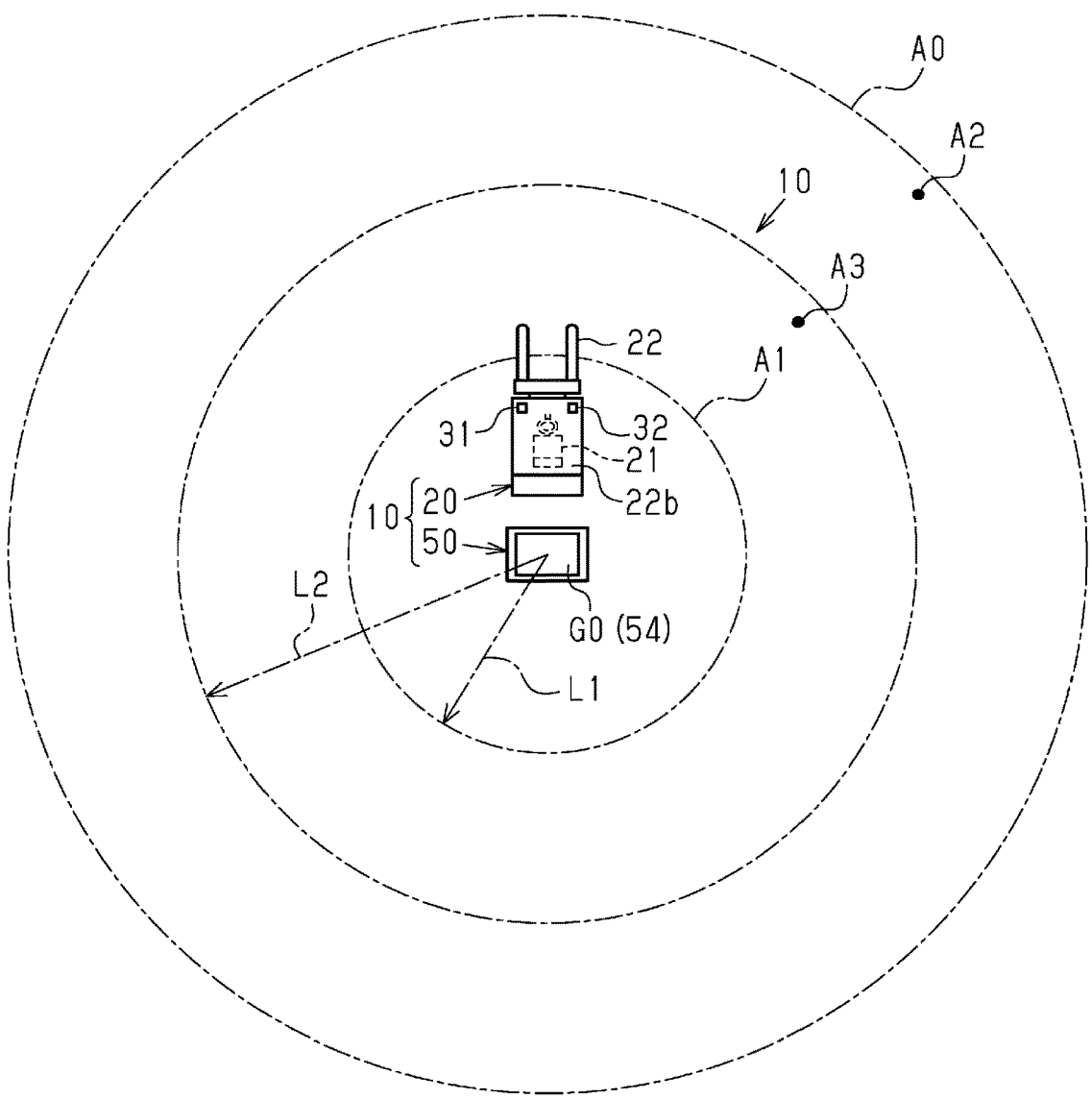
FIG. 2 is a top view schematically showing ranges.

As shown in FIGS. 1 and 2, an industrial vehicle remote control system 10 includes a forklift 20, which serves as an industrial vehicle, and a remote control device 50, which is used to remotely control the forklift 20.

As shown in FIGS. 1 and 2, the forklift 20 includes a body 22 having a driver seat 21, wheels 23, and forks 24, which serve as a material handling device and move in the up-down direction to lift or lower materials.

The body 22 includes a frame 22a, which extends upright to surround the driver seat 21, and a roof 22b, which covers the driver seat 21 from above. The forklift 20 is configured to be operable by a driver who is seated in the driver seat 21.

The forklift 20 may be an engine forklift, which has an engine, an EV forklift, which has a power storage device and an electric motor, or an FCV forklift, which has a fuel cell and an electric motor. Further, the forklift 20 may be an HV forklift, which has an engine, a power storage device, and an electric motor.

Figure 3:
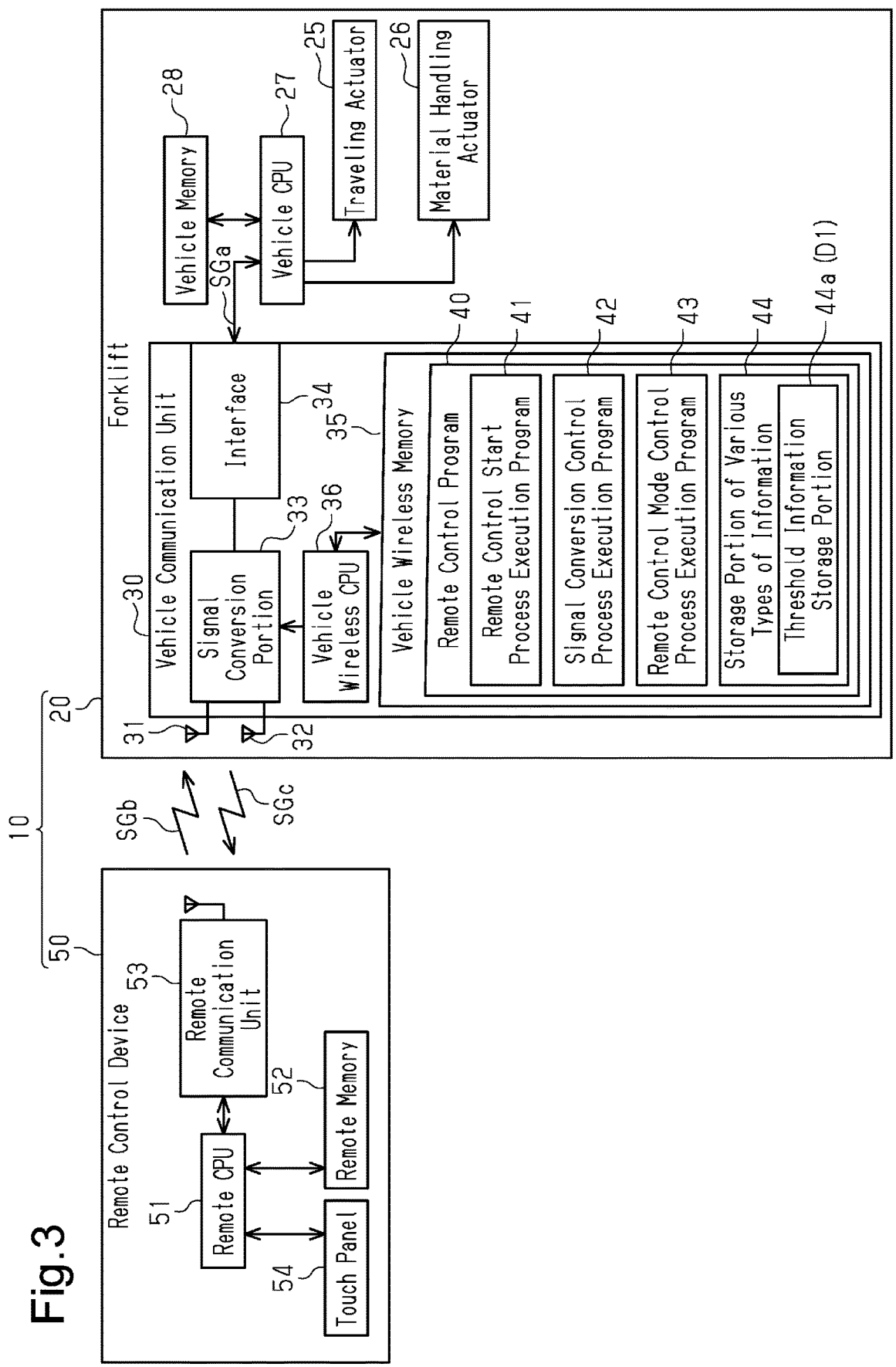
FIG. 3 is a block diagram showing the electrical configuration of an industrial vehicle remote control system of a first embodiment.

As shown in FIGS. 1 and 3, the forklift 20 includes a traveling actuator 25, a material handling actuator 26, a vehicle CPU 27, which controls the traveling actuator 25 and the material handling actuator 26, a vehicle memory 28, and a vehicle communication unit 30, which serves as a vehicle communication portion.

The traveling actuator 25 is used for traveling of the forklift 20. The traveling actuator 25 rotates the wheels 23 and changes the traveling direction of the forklift 20. When the forklift 20 is an engine forklift, the traveling actuator 25 may be the engine and the steering system. When the forklift 20 is an EV forklift, the traveling actuator 25 may be the electric motor for rotating the wheels 23 and the steering system.

The material handling actuator 26 drives the forks 24. For example, the material handling actuator 26 includes a material handling motor and a mechanism that moves the forks 24 in the up-down direction using the driving force of the material handling motor.

The vehicle CPU 27 is configured to receive control signals SGa. When a control signal SGa is input, the vehicle CPU 27 reads and executes a control program stored in the vehicle memory 28 to control the traveling actuator 25 and the material handling actuator 26. The vehicle CPU 27 may also be referred to as a vehicle ECU or a vehicle MPU.

The control signal SGa is a signal used in the network in the forklift 20 and may be a CAN signal. However, the format of the control signal SGa is not limited to this and may be any format.

The vehicle communication unit 30 communicates wirelessly with a remote control device 50 having a wireless communication function. The vehicle communication unit 30 receives remote control signals SGb, which are output by the remote control device 50, and transmits detection signals for transmission, which relate to vehicle information, to the remote control device 50.

As shown in FIGS. 2 and 3, the vehicle communication unit 30 includes a first antenna 31 and a second antenna 32, which receive remote control signals SGb sent from the remote control device 50, a signal conversion portion 33, which is configured to convert remote control signals SGb into control signals SGa, and an interface 34, which outputs control signals SGa converted by the signal conversion portion 33.

As shown in FIG. 2, the first antenna 31 is spaced apart from the second antenna 32. The antennas 31 and 32 are mounted on the upper surface of the roof 22b and spaced apart from each other in the right-left direction of the forklift 20.

However, the antennas 31 and 32 may be mounted on any other positions. For example, the first antenna 31 may be at a position on the roof 22b frontward of the forklift 20, while the second antenna 32 may be at a position on the roof 22b rearward of the forklift 20. The antennas 31 and 32 do not have to be aligned in the right-left direction or in the front-rear direction.

Further, at least one of the antennas 31 and 32 may be positioned on the frame 22a. The distance between the antennas 31 and 32 may be any distance as long as the antennas 31 and 32 are not in a null simultaneously.

The vehicle communication unit 30 selects one of the antennas 31 and 32 and, using the selected antenna, exchanges signals with a remote communication unit 53 of the remote control device 50. Specifically, the vehicle communication unit 30 receives from the remote communication unit 53 a remote control signal SGb, which contains remote control data on remote control. In addition, the vehicle communication unit 30 is configured such that the received remote control signal SGb is input to the signal conversion portion 33.

The signal format of the remote control signal SGb is a wireless communication format that is different from the signal format of the control signal SGa. The signal conversion portion 33 performs signal conversion between a remote control signals SGb and a control signal SGa, which differ from each other in signal format (or signal type). The remote control signal SGb may be considered as a signal in a wireless communication format.

Although the remote control signal SGb and the control signal SGa differ in signal format, they contain the same data content, specifically, the same remote control data that determines a specific behavior of the forklift 20. That is, the signal conversion portion 33 converts a remote control signal SGb, which has a communication format for exchange between the communication units 30 and 53 and contains information on remote control (remote control data), into a control signal SGa, which has a communication format that can be identified by the vehicle CPU 27 and contains the information on remote control that is set in the remote control signal SGb.

The control signal SGa converted by the signal conversion portion 33 is output to the vehicle CPU 27 through the interface 34. The control signal SGa corresponding to the remote control signal SGb is thus input to the vehicle CPU 27. The vehicle CPU 27 drives the traveling actuator 25 based on the control signal SGa, allowing the forklift 20 to travel according to the remote control signal SGb.

The forklift 20 is configured to have a limited traveling speed when remotely controlled. Specifically, the forklift 20 is configured to have the maximum speed during remote control that is less than the maximum speed during direct operation performed from the driver seat 21.

As shown in FIG. 3, the vehicle communication unit 30 includes a vehicle wireless memory 35 and a vehicle wireless CPU 36.

The vehicle wireless memory 35 stores a remote control program 40. The remote control program 40 includes execution programs 41 to 43, which execute various processes, and a storage portion of various types of information 44. The remote control program 40 corresponds to a "industrial vehicle remote control program". The vehicle wireless memory 35 corresponds to a "computer-readable recording medium," which stores the industrial vehicle remote control program. The computer-readable recording medium may be any medium that stores various computer programs in any form, such as electronic, magnetic, optical, or electromagnetic form. The computer-readable recording medium may include a non-transitory computer-readable recording medium.

The vehicle wireless CPU 36 controls the signal conversion portion 33 by reading the execution programs 41 to 43 stored in the vehicle wireless memory 35 and performing various processes. Depending on the remote control mode, the vehicle wireless CPU 36 permits or prohibits signal conversion by the signal conversion portion 33. The processes performed by the vehicle wireless CPU 36 will be described below.

The remote control device 50 is an operation terminal having a wireless communication function. The remote control device 50 is a general-purpose device such as a mobile phone, a smartphone, a tablet terminal, or a virtual reality terminal. However, the remote control device 50 is not limited to these and may be a specialized device for remote control.

The remote control device 50 includes a remote CPU 51, a remote memory 52, a remote communication unit 53, which serves as a control device communication portion, and a touch panel 54.

The remote CPU 51 performs various processes using various programs stored in the remote memory 52. The remote CPU 51 is electrically connected to the remote communication unit 53 and the touch panel 54 to exchange signals with the remote communication unit 53 and the touch panel 54.

The remote communication unit 53 is configured to communicate wirelessly with the vehicle communication unit 30. This allows the remote control device 50 and the forklift 20 to exchange signals between each other.

The communication system used between the vehicle communication unit 30 and the remote communication unit 53 is Wi-Fi (in other words, a wireless LAN according to the IEEE 802.11 standard). The two communication units 30 and 53 transmit and receive signals through packet switching. That is, the remote communication unit 53 transmits remote control signals SGb of a Wi-Fi signal format to the vehicle communication unit 30 through packet switching.

Wi-Fi has various standards including IEEE802.11a and IEEE802.11ac. The communication system between the vehicle communication unit 30 and the remote communication unit 53 may be any of them. Further, the signal exchange between the two communication units 30 and 53 is not limited to packet switching and may be any type of communication.

As shown in FIG. 1, the touch panel 54 is formed on one surface of the remote control device 50. The touch panel 54 includes a display screen with touch sensors. The touch panel 54 outputs a signal relating to an input operation (touch) on the touch panel 54 to the remote CPU 51. This allows the remote CPU 51 to acquire an input operation on the touch panel 54, such as a touch on an icon when the touch panel 54 displays icons. That is, the touch panel 54 may be considered as an input portion that is operated by the operator, and also as a reception portion that receives input operation.

The remote CPU 51 controls the display on the touch panel 54. For example, for remote control of the forklift 20, the remote CPU 51 displays an operation screen G0 for remote control. This allows the operator to perform various input operations for remote control.

As shown in FIG. 1, the operation screen G0 may display a forward icon Ic1 for moving the forklift 20 forward, a backward icon Ic2 for moving the forklift 20 backward, a left icon Ic3 for turning the forklift 20 to the left, and a right icon Ic4 for turning the forklift 20 to the right.

The operation screen G0 also displays the current remote control mode, which will be described below. The touch panel 54 corresponds to an "indication portion." The items displayed on the operation screen G0 are not limited to the above, and other items, such as a handle-shaped icon, may be displayed.

The remote memory 52 stores various programs for remote control of the forklift 20. For example, the remote memory 52 stores an execution program for performing a remote control signal transmission process, which generates and transmits a remote control signal SGb.

While the touch panel 54 displays the operation screen G0, the remote CPU 51 reads the execution program stored in the remote memory 52 and performs the remote control signal transmission process. The remote control signal transmission process is periodically performed at predetermined specific intervals Ta. That is, the remote control device 50 periodically transmits remote control signals SGb at the specific intervals Ta.

The remote control signal transmission process is now described.

The remote CPU 51 first acquires the manner of input operation performed on the touch panel 54. For example, when the icons Ic1 to Ic4 are displayed on the operation screen G0, the remote CPU 51 identifies which of the icons Ic1 to Ic4 has received an input operation (touch). The remote CPU 51 then generates a remote control signal SGb according to the manner of input operation performed on icons Ic1 to Ic4 on the touch panel 54.

The remote control signal SGb includes operation data corresponding to the manner of input operation performed on the operation screen G0. For example, when acquiring the fact that the forward icon Ic1 is operated (touched), the remote CPU 51 performs a process of generating a remote control signal SGb in which operation data corresponding to forward movement of the forklift 20 is set. When acquiring the fact that the right icon Ic4 is operated (touched), the remote CPU 51 performs a process of generating a remote control signal SGb in which operation data corresponding to right turn of the forklift 20 is set. Then, the remote CPU 51 transmits the remote control signal SGb through the remote communication unit 53.

When there is no input operation performed on the operation screen G0, that is, when the operator does not perform any operation, the remote CPU 51 generates and transmits a remote control signal SGb in which operation data indicating the absence of input operation (e.g., null data) is set. That is, the remote control device 50 is configured to transmit remote control signals SGb at the specific intervals Ta regardless of the presence or absence of input operation on the operation screen G0. As such, the forklift 20 (specifically, the vehicle communication unit 30) periodically receives remote control signals SGb at the specific intervals Ta.

The remote communication unit 53 transmits remote control signals SGb at a fixed radio wave intensity. Thus, the transmitted radio wave intensity of the remote control signals SGb does not change.

As shown in FIG. 2, in the configuration that performs remote control of the forklift 20 with remote control signals SGb sent from the remote control device 50, remote control using the remote control device 50 is possible when the forklift 20 is in the communication range A0 of the two communication units 30 and 53. The communication range A0 is the transmission/reception range of remote control signals SGb. In other words, the communication range A0 may be considered as a range in which remote control using the remote control device 50 is possible. Depending on the communication range A0, remote control of the forklift 20 is possible even when the forklift 20 is located at a position that is not clearly visible by the operator of the remote control device 50. This may cause an error in operation of the forklift 20.

In particular, the communication units 30 and 53 use Wi-Fi as the communication system. Generally, the communication range A0 of Wi-Fi can be in the range of several tens of meters to one hundred and several tens of meters. Accordingly, it is possible to remotely control the forklift 20 that is too far for the operator to clearly see.

However, the industrial vehicle remote control system 10 is configured to prohibit remote control using the remote control device 50 when the forklift 20 is excessively far as described above. Specifically, the industrial vehicle remote control system 10 acquires the position of the forklift 20 based on the received radio wave intensity RS of the remote control signal SGb and, based on the position of the forklift 20, determines whether to permit or prohibit remote control relating to traveling using the remote control device 50.

Referring to FIG. 4, the received radio wave intensity RS is now described. FIG. 4 is a graph showing the relationship between the received radio wave intensity RS and the distance between the two communication units 30 and 53. The solid line shows an ideal curve (or an approximate curve derived from a plurality of data pieces), while a broken line and a long dashed short dashed line show the actual received radio wave intensities RS measured under same conditions.

The received radio wave intensity RS is a parameter calculated based on the ratio between the intensity of a remote control signal SGb transmitted by the remote communication unit 53 and the intensity of the remote control signal SGb received by the vehicle communication unit 30 (specifically, one of the two antennas 31 and 32).

As shown in FIG. 4, the received radio wave intensity RS decreases as the distance between the two communication units 30 and 53 increases. It is thus possible to estimate the distance between the two communication units 30 and 53 based on the received radio wave intensity RS of the remote control signal SGb received by the vehicle communication unit 30.

In this configuration, based on the received radio wave intensity RS, the industrial vehicle remote control system 10 determines whether the forklift 20 is in a permission range A1 or in a prohibition range A2, which is farther from the remote control device 50 than the permission range A1. The industrial vehicle remote control system 10 is configured to permit remote control relating to traveling using the remote control device 50 when the forklift 20 is in the permission range A1, and to prohibit remote control relating to traveling using the remote control device 50 when the forklift 20 is in the prohibition range A2. When the remote control is prohibited while the forklift 20 is traveling, the forklift 20 stops at the position.

As shown in FIG. 2, the permission range A1, in which remote control relating to traveling using the remote control device 50 is permitted, has the remote control device 50 (the remote communication unit 53) in its center. The permission range A1 is closer to the remote control device 50 than the prohibition range A2 and is assumed to be a desirable range in which the operator can clearly see the forklift 20. When there is no obstacle or other objects, the permission range A1 at least includes a circular range that has the remote control device 50 (the remote communication unit 53) in its center and has a radius of a first distance L1.

In contrast, the prohibition range A2, in which remote control relating to traveling using the remote control device 50 is prohibited, is located outward of the permission range A1. As such, the prohibition range A2 is assumed to be a range in which the operator cannot clearly see the forklift 20 as compared to the permission range A1. The prohibition range A2 includes a range that is separated from the remote control device 50 (the remote communication unit 53) by at least a second distance L2. The second distance L2 is longer than the first distance L1. The specific values of the first distance L1 and the second distance L2 may be appropriately set taking the visibility for the operator into account. For example, the first distance L1 may be greater than or equal to 5 m and less than 10 m, and the second distance L2 may be greater than or equal to 10 m.

The permission range A1 and the prohibition range A2 are set within the communication range A0. Specifically, the first distance L1 and the second distance L2 are shorter than the possible communication distance of the two communication units 30 and 53.

Since the second distance L2 is longer than the first distance L1, an error accommodation range A3 is set between the permission range A1 and the prohibition range A2. The error accommodation range A3 is set in consideration of errors in received radio wave intensities RS. When the forklift 20 is in the error accommodation range A3, remote control relating to traveling using the remote control device 50 can be permitted or prohibited.

The relationship between the received radio wave intensity RS and the ranges A1 to A3 is now described.

The industrial vehicle remote control system 10 is configured to determine that the forklift 20 is in the permission range A1 when a state in which the received radio wave intensity RS is greater than or equal to a predetermined threshold Rsth continues for a first determination period T1. On the other hand, the industrial vehicle remote control system 10 is configured to determine that the forklift 20 is in the prohibition range A2 when a state in which the received radio wave intensity RS is less than the threshold intensity RSth continues for a second determination period T2. The process of determining whether the forklift 20 is in the permission range A1 or the prohibition range A2 based on the received radio wave intensity RS and the two determination periods T1 and T2 is referred to as possibility determination.

As indicated by the broken line and the long dashed short dashed line in FIG. 4, the received radio wave intensity RS tends to have considerable errors. For this reason, the received radio wave intensity RS actually acquired (detected) can deviate from the ideal curve.

The threshold intensity RSth is set higher than the received radio wave intensity RS corresponding to the second distance L2 irrespective of the presence or absence of an error in the received radio wave intensity RS, for example. Specifically, the threshold intensity RSth is set higher than a value obtained by adding the estimated maximum error or the standard deviation to the received radio wave intensity RS corresponding to the second distance L2 in the ideal curve. Thus, even if the received radio wave intensity RS has an error, a state in which the received radio wave intensity RS is less than the threshold intensity RSth is more likely to continue for the second determination period T2 or longer when the distance between the two communication units 30 and 53 is longer than the second distance L2. This increases the likelihood of the forklift 20 being determined to be in the prohibition range A2.

Further, the threshold intensity RSth is set lower than a value obtained by subtracting the estimated maximum error or standard deviation from the received radio wave intensity RS corresponding to the first distance L1 in the ideal curve, for example. Thus, even if the received radio wave intensity RS has an error, a state in which the received radio wave intensity RS is greater than or equal to the threshold intensity RSth is more likely to continue for the first determination period T1 or longer when the distance between the two communication units 30 and 53 is less than the first distance L1. This increases the likelihood of the forklift 20 being determined to be in the permission range A1. In terms of the relationship described above, the first distance L1 may be considered as the distance corresponding to the received radio wave intensity RS that is obtained by adding the maximum error or the standard deviation to the threshold intensity RSth in the ideal curve.

An error in the received radio wave intensity RS may be a measurement error or an error in high-frequency components, for example. Any variation in the received radio wave intensity RS caused by the environment where the forklift 20 is placed is not considered as an error. The variation in the received radio wave intensity RS caused by factors in the environment where the forklift 20 is placed can be an overall upward or downward shift of the received radio wave intensity RS or a local variation in a specific area within the communication range A0 (a dead spot Ax and a hot spot Ay). Such variation in the received radio wave intensity RS caused by the environment where of the forklift 20 is placed will be described in the third and fourth embodiments.

The error accommodation range A3 between the permission range A1 and the prohibition range A2 is a range for accommodating an error in the received radio wave intensity RS. When the forklift 20 is in the error accommodation range A3, an error in the received radio wave intensity RS may change the result of comparison between the received radio wave intensity RS and the threshold intensity RSth. When the forklift 20 is in the error accommodation range A3, the forklift 20 can be determined to be in the permission range A1 in some cases or determined to be in the prohibition range A2 in other cases.

Referring to FIG. 5, the modes of remote control of the forklift 20 using the remote control device 50 are now described. When the forklift 20 is not in the communication range A0, that is, when the communication units 30 and 53 cannot communicate wirelessly, remote control using the remote control device 50 is naturally impossible. The following description assumes that the forklift 20 is in the communication range A0.

The industrial vehicle remote control system 10 has a plurality of remote control modes relating to traveling of the forklift 20 using the remote control device 50. The plurality of remote control modes includes an initial mode, a permission mode, a warning mode, and a prohibition mode.

The initial mode is a remote control mode set at the start of remote control. The start of remote control may be when the power of the remote control device 50 is turned on (activated), when an application relating to remote control is started, when communication between the remote control device 50 and the forklift 20 is started, or when the remote control device 50 is paired with the forklift 20, for example. Since the initial mode is a remote control mode that is set under those conditions, the position of the forklift 20 in the initial mode may vary. That is, it is indefinite whether the forklift 20 is in the permission range A1 or in the prohibition range A2. The initial mode prohibits remote control relating to traveling using the remote control device 50.

The permission mode is a remote control mode that is active when the forklift 20 is assumed to be in the permission range A1. The permission mode is a remote control mode that permits remote control relating to traveling.

The warning mode is a remote control mode that is active when the forklift 20 is assumed to have moved from the permission range A1 into the prohibition range A2. The warning mode is a remote control mode that permits remote control relating to traveling. The warning mode corresponds to a "suspension mode."

The prohibition mode is a remote control mode that is active when the forklift 20 is assumed to be in the prohibition range A2.

As described above, the prohibition range A2 is in the communication range A0. Thus, the two communication units 30 and 53 can communicate wirelessly even when the forklift 20 is in the prohibition range A2. In this regard, the prohibition mode is a remote control mode that prohibits remote control relating to traveling even under conditions where the wireless communication between the two communication units 30 and 53 is performed. That is, the prohibition mode may be considered as a remote control mode that actively prohibits remote control using the remote control device 50 under conditions where the wireless communication between the two communication units 30 and 53 is performed. The prohibition mode is not a mode in which disabled wireless communication between the two communication units 30 and 53 prevents remote control. Likewise, the prohibition range A2 is a range in which remote control relating to traveling is prohibited even under conditions where the wireless communication between the two communication units 30 and 53 is performed. The conditions where the wireless communication between the two communication units 30 and 53 is performed are conditions where signals including remote control signals SGb can be transmitted and received normally, enabling data communication.

The vehicle wireless CPU 36 is configured to perform a remote control start process, which relates to the initial setting of the remote control mode, a signal conversion control process, which permits or prohibits signal conversion by the signal conversion portion 33 according to the remote control mode, and a remote control mode control process, which controls the remote control mode based on possibility determination and the determination result (possibility determination result).

The specific steps in each process are now described.

At the start of remote control using the remote control device 50, the vehicle wireless CPU 36 reads the remote control start process execution program 41 stored in the remote control program 40 and performs a remote control start process.

Referring to FIG. 6, the remote control start process is now described.

At step S101, the vehicle wireless CPU 36 sets the remote control mode to the initial mode. Specifically, the storage portion of various types of information 44 of the remote control program 40 stores remote control mode identification information, which is used to identify the current remote control mode. The vehicle wireless CPU 36 updates the remote control mode identification information to information corresponding to the initial mode.

Then, at step S102, the vehicle wireless CPU 36 selects the first antenna 31 as the antenna to be used. The first antenna 31 is thus used as the selected antenna, and the vehicle wireless CPU 36 transmits and receives signals using the first antenna 31 until the selected antenna is switched.

At step S103, the vehicle wireless CPU 36 performs an initial mode notification process for notifying that the remote control mode is the initial mode. Specifically, the vehicle wireless CPU 36 transmits to the remote communication unit 53 using the first antenna 31 a notification signal in which information corresponding to the initial mode is set. The vehicle wireless CPU 36 then ends this remote control process.

When the remote communication unit 53 receives the notification signal, the remote CPU 51 indicates using the touch panel 54 that the initial mode is active. For example, the remote CPU 51 displays on the operation screen G0 that the initial mode is active.

After the remote control start process, upon receiving each remote control signal SGb, the vehicle wireless CPU 36 reads the signal conversion control process execution program 42 of the remote control program 40 and performs a signal conversion control process, which controls the signal conversion portion 33.

Figure 7:
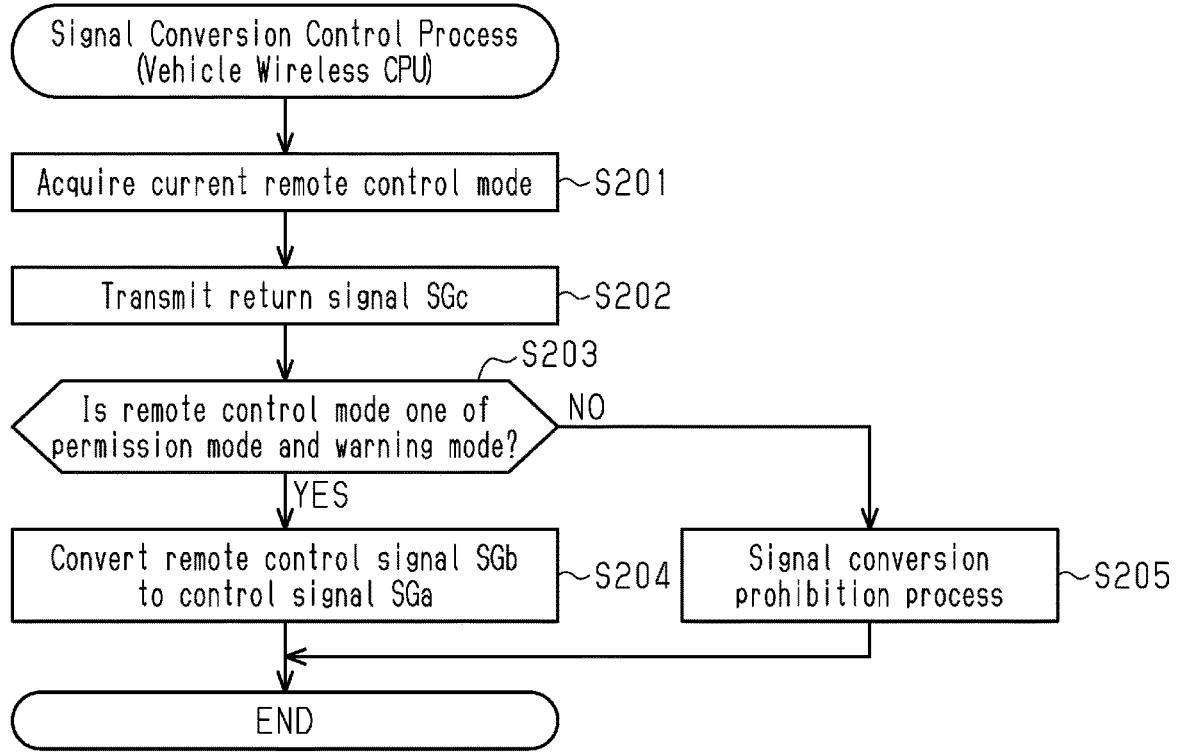
FIG. 7 is a flowchart showing a signal conversion control process.

Referring to FIG. 7, the signal conversion control process is now described.

As shown in FIG. 7, at step S201, the vehicle wireless CPU 36 first refers to the remote control mode identification information to acquire the current remote control mode.

At subsequent step S202, the vehicle wireless CPU 36 transmits a return signal SGc to the remote communication unit 53 using the first antenna 31 or the second antenna 32 (i.e., the selected antenna). The return signal SGc indicates that the remote control signal SGb that has triggered the current signal conversion control process is received.

When the remote communication unit 53 receives this return signal SGc, the remote CPU 51 identifies that the transmission of the remote control signal SGb has been successfully completed. That is, during remote control, the two communication units 30 and 53 periodically transmit and receive remote control signals SGb and return signals SGc.

At step S203, the vehicle wireless CPU 36 determines whether the current remote control mode acquired at step S201 is one of the permission mode and the warning mode.

When the current remote control mode is the permission mode or the warning mode, the vehicle wireless CPU 36 proceeds to step S204, controls the signal conversion portion 33 to convert the remote control signal SGb to a control signal SGa, and ends this signal conversion control process. The control signal SGa is output to the vehicle CPU 27 through the interface 34.

In contrast, when the current remote control mode is the initial mode or the prohibition mode, the vehicle wireless CPU 36 determines that the outcome is NO at step S203 and proceeds to step S205. At step S205, the vehicle wireless CPU 36 performs a signal conversion prohibition process, which prohibits signal conversion by the signal conversion portion 33, and then ends this signal conversion control process. This signal conversion control process does not output a control signal SGa to the vehicle CPU 27.

In this configuration, when the remote control mode is the permission mode or the warning mode, the control signal SGa corresponding to the remote control signal SGb is output to the vehicle CPU 27, and the vehicle CPU 27 controls the actuators 25 and 26 corresponding to the control signal SGa. The forklift 20 is thus remotely controlled using the remote control device 50.

In contrast, when the remote control mode is the initial mode or the prohibition mode, the control signal SGa corresponding to the remote control signal SGb is not output to the vehicle CPU 27. The forklift 20 is therefore not remotely controlled using the remote control device 50.

When the remote control mode is the initial mode or the prohibition mode, the remote control signal SGb is not converted to a control signal SGa, prohibiting remote control of any action including traveling. As such, when the remote control mode is the initial mode or the prohibition mode, remote control of the forks 24, for example, is also prohibited.

Upon receiving each remote control signal SGb, the vehicle wireless CPU 36 reads the remote control mode control process execution program 43 of the remote control program 40 and performs a remote control mode control process. In accordance with the remote control signals SGb sent periodically at the specific intervals Ta, remote control mode control processes are performed periodically at the specific intervals Ta. That is, upon receiving a remote control signal SGb, the vehicle wireless CPU 36 performs both the signal conversion control process and the remote control mode control process.

Figure 8:
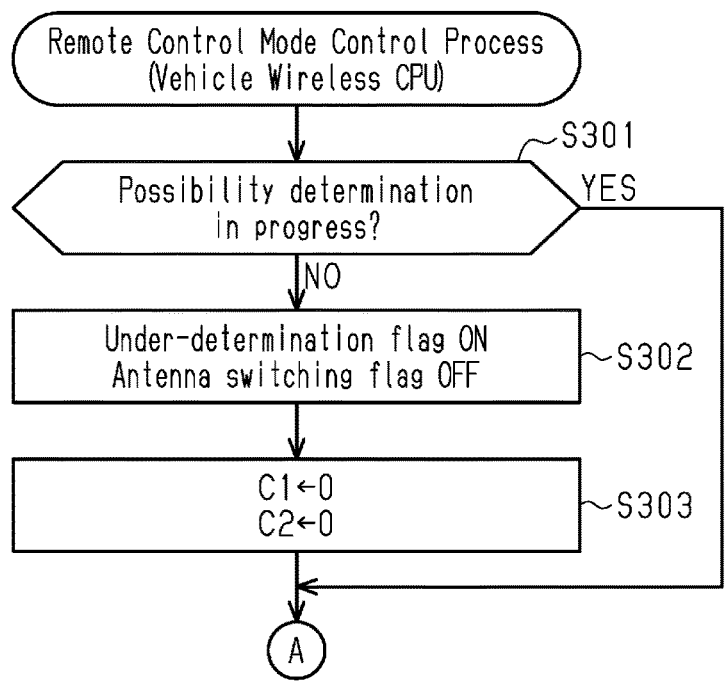
FIG. 8 is a flowchart showing a remote control mode control process.
Figure 9:
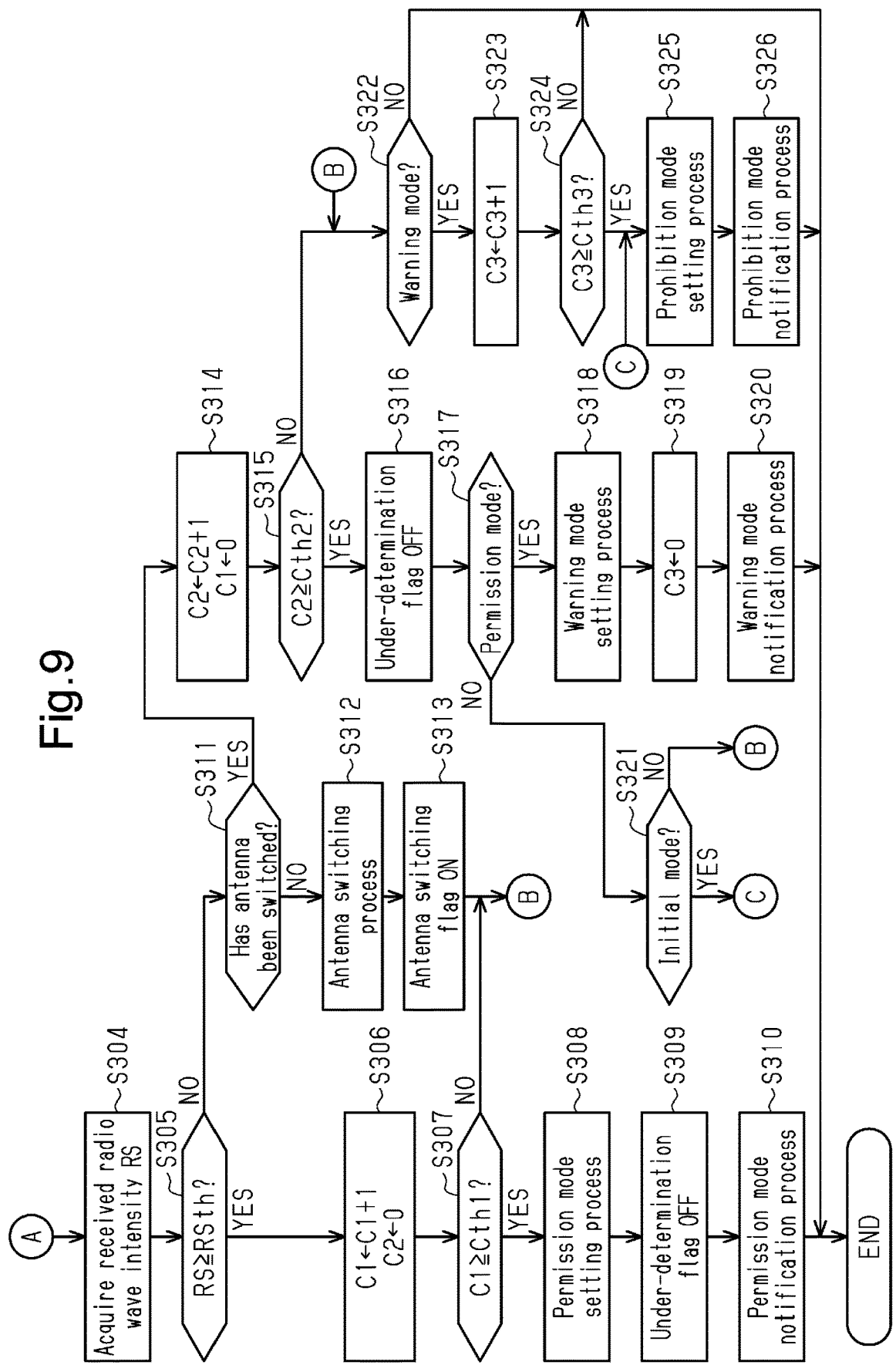
FIG. 9 is a flowchart showing the main part of a remote control mode control process.

Referring to FIGS. 8 and 9, the remote control mode control process is now described.

As shown in FIG. 8, at step S301, the vehicle wireless CPU 36 first determines whether possibility determination is in progress. Specifically, the storage portion of various types of information 44 includes an under-determination flag storage region for storing an under-determination flag used to identify whether possibility determination is in progress. When the under-determination flag is stored in the under-determination flag storage region, the vehicle wireless CPU 36 determines that possibility determination is in progress. If the under-determination flag is not stored, the vehicle wireless CPU 36 determines that possibility determination is not in progress. The under-determination flag is initially OFF.

When possibility determination is in progress, the vehicle wireless CPU 36 proceeds to step S304. Otherwise, at steps S302 and S303, the vehicle wireless CPU 36 performs the initial setting for starting possibility determination and then proceeds to step S304.

Specifically, at step S302, the vehicle wireless CPU 36 sets an under-determination flag to ON and sets the antenna switching flag to OFF. The antenna switching flag is in an antenna switching flag storage region in the storage portion of various types of information 44. The antenna switching flag is used to determine whether the selected antenna has been switched during the possibility determination.

At subsequent step S303, the vehicle wireless CPU 36 sets a first counter C1 and a second counter C2 in the storage portion of various types of information 44 to 0. The first counter C1 is used for counting regarding the first determination period T1, and the second counter C2 is used for counting regarding the second determination period T2.

As shown in FIG. 9, at step S304, the vehicle wireless CPU 36 acquires the received radio wave intensity RS of the remote control signal SGb that has triggered the current remote control mode control process. Specifically, the vehicle wireless CPU 36 detects the intensity (i.e., received power) of the remote control signal SGb received by the selected antenna. The storage portion of various types of information 44 stores information on the transmitted intensity (i.e., transmitted power) of the remote control signal SGb. The vehicle wireless CPU 36 calculates the received radio wave intensity RS from these values. The process of step S304 corresponds to an "identification step," and the vehicle wireless CPU 36, which performs the process of step S304, corresponds to an "acquisition portion."

The vehicle communication unit 30 may include, in addition to the vehicle wireless CPU 36, a specialized hardware circuit for calculation of the received radio wave intensity RS. In this case, the vehicle wireless CPU 36 acquires the received radio wave intensity RS based on a signal from the hardware circuit.

At step S305, the vehicle wireless CPU 36 determines whether the received radio wave intensity RS acquired at step S304 is greater than or equal to the threshold intensity RSth.

Specifically, as shown in FIG. 3, the storage portion of various types of information 44 includes a threshold information storage portion 44a, which serves as a storage portion storing threshold information D1 on the threshold intensity RSth. At step S305, the vehicle wireless CPU 36 reads the threshold information D1 stored in the threshold information storage portion 44a and performs possibility determination using the threshold intensity RSth set in the threshold information D1. Specifically, the vehicle wireless CPU 36 determines whether the received radio wave intensity RS acquired at step S304 is greater than or equal to the threshold intensity RSth set in the threshold information D1. The threshold intensity RSth is described above.

The threshold information D1 is the value data of the threshold intensity RSth. However, the threshold information D1 is not limited to this and may be any information from which the threshold intensity RSth is unambiguously obtainable, such as predetermined function data.

Further, the threshold information D1 stored in the threshold information storage portion 44a may be updatable data or data that is not updatable. That is, the threshold intensity RSth may be a variable value or a fixed value.

When the received radio wave intensity RS is greater than or equal to the threshold intensity RSth, the vehicle wireless CPU 36 proceeds to step S306.

At step S306, the vehicle wireless CPU 36 increments the first counter C1. Specifically, the vehicle wireless CPU 36 adds 1 to the first counter C1. The vehicle wireless CPU 36 also sets the second counter C2 to 0.

At step S307, the vehicle wireless CPU 36 determines whether the first counter C1 is greater than or equal to a predetermined first specified value Cth1. The first specified value Cth1 is set corresponding to the first determination period T1. Specifically, the first specified value Cth1 is obtained by dividing the first determination period T1 by the specific interval Ta. The first specified value Cth1 is a value greater than or equal to 2. Accordingly, the first determination period T1 is at least twice as long as the specific interval Ta.

When the received radio wave intensity RS is greater than or equal to the threshold intensity RSth, the first counter C1 is incremented in each remote control mode control process. As such, the process of step S307 may be considered as a process of determining whether a state in which the received radio wave intensity RS is greater than or equal to the threshold intensity RSth continues for the first determination period T1 or longer.

When the first counter C1 is less than the first specified value Cth1, the vehicle wireless CPU 36 proceeds to step S322. When the first counter C1 is greater than or equal to the first specified value Cth1, this indicates that a state in which the received radio wave intensity RS is greater than or equal to the threshold intensity RSth has continued for the first determination period T1. In this case, the vehicle wireless CPU 36 determines that the forklift 20 is in the permission range A1, that is, the result of the current possibility determination is within the permission range A1, and performs processes corresponding to the permission mode at steps S308 to S310.

Specifically, at step S308, the vehicle wireless CPU 36 performs a process of setting the remote control mode to the permission mode. For example, when the current remote control mode is the initial mode, warning mode, or the prohibition mode, the vehicle wireless CPU 36 switches the remote control mode from the current mode to the permission mode. Specifically, the vehicle wireless CPU 36 updates the remote control mode identification information to information corresponding to the permission mode. When the current remote control mode is the permission mode, at step S308, the vehicle wireless CPU 36 performs a process of maintaining the permission mode.

At subsequent step S309, the vehicle wireless CPU 36 sets the under-determination flag to OFF to indicate that the current possibility determination is completed. At step S310, the vehicle wireless CPU 36 performs a permission mode notification process to notify that the remote control mode is the permission mode, and then ends this remote control mode control process. Specifically, the vehicle wireless CPU 36 transmits to the remote communication unit 53 using the selected antenna a notification signal in which information corresponding to the permission mode is set.

When the remote communication unit 53 receives the notification signal, the remote CPU 51 indicates using the touch panel 54 that the permission mode is active. For example, the remote CPU 51 displays on the operation screen G0 that the permission mode is active.

As shown in FIG. 9, when the received radio wave intensity RS is not greater than or equal to the threshold intensity RSth, that is, when the received radio wave intensity RS is less than the threshold intensity RSth, the vehicle wireless CPU 36 determines that the outcome is NO at step S305 and proceeds to step S311.

At step S311, the vehicle wireless CPU 36 determines whether the selected antenna has been switched. Specifically, the vehicle wireless CPU 36 determines whether the antenna switching flag is ON (set).

When the antenna switching flag is OFF, this indicates that the selected antenna has not been switched in the current possibility determination. In this case, at step S312, the vehicle wireless CPU 36 performs an antenna switching process to switch the selected antenna. Specifically, when the first antenna 31 is currently selected as the selected antenna, the vehicle wireless CPU 36 switches the selected antenna from the first antenna 31 to the second antenna 32. When the second antenna 32 is currently selected as the selected antenna, the vehicle wireless CPU 36 switches the selected antenna from the second antenna 32 to the first antenna 31. Consequently, the remote control signals SGb following the remote control signal SGb that has triggered the current remote control mode control process are received using the switched selected antenna.

Then, at step S313, the vehicle wireless CPU 36 sets the antenna switching flag to ON and proceeds to step S322. This allows for acquiring the fact that the selected antenna has been switched in the current possibility determination. That is, in this example, the specified number of times of switching of the selected antenna in each possibility determination is 1.

In contrast, when the antenna switching flag is ON, this indicates that the selected antenna has already been switched in the current possibility determination. That is, the received radio wave intensity RS of the remote control signal SGb received by the selected antenna that has been switched is less than the threshold intensity RSth. In this case, the vehicle wireless CPU 36 determines that the outcome is YES at step S311 and proceeds to step S314.

At step S314, the vehicle wireless CPU 36 increments the second counter C2. Specifically, the vehicle wireless CPU 36 adds 1 to the second counter C2.

In addition, at step S314, the vehicle wireless CPU 36 sets the first counter C1 to 0. That is, when the received radio wave intensity RS is less than the threshold intensity RSth, the vehicle wireless CPU 36 resets the first counter C1 to 0 before the first counter C1 reaches the first specified value Cth1. This avoids the first counter C1 being incremented continually and reaching the first specified value Cth1. The same applies to the second counter C2.

At subsequent step S315, the vehicle wireless CPU 36 determines whether the second counter C2 is greater than or equal to a predetermined second specified value Cth2. The second specified value Cth2 is set corresponding to the second determination period T2. Specifically, the second specified value Cth2 is obtained by dividing the second determination period T2 by the specific interval Ta. The second specified value Cth2 is a value greater than or equal to 2. Accordingly, the second determination period T2 is at least twice as long as of the specific interval Ta.

The first specified value Cth1 is identical to the second specified value Cth2. However, they may be different values. That is, the first and second determination periods T1 and T2 may be either identical or different.

When the second counter C2 is less than the second specified value Cth2, the vehicle wireless CPU 36 proceeds to step S322. When the second counter C2 is greater than or equal to the second specified value Cth2, this indicates that a state in which the received radio wave intensity RS is less than the threshold intensity RSth has continued for the second determination period T2. In this case, the vehicle wireless CPU 36 determines that the forklift 20 is in the prohibition range A2, that is, the result of current possibility determination is within the prohibition range A2, and performs the processes from step S316.

At step S316, the vehicle wireless CPU 36 sets the under-determination flag to OFF to indicate that the current possibility determination is completed. Then, at step S317, the vehicle wireless CPU 36 refers to the remote control mode identification information and determines whether the current remote control mode is the permission mode (that is, whether the permission mode is active).

When the current remote control mode is the permission mode, at steps S318 to S320, the vehicle wireless CPU 36 performs a process of switching the remote control mode from the permission mode to the warning mode.

Specifically, at step S318, the vehicle wireless CPU 36 performs a process of setting the remote control mode to the warning mode. That is, the vehicle wireless CPU 36 updates the remote control mode identification information to information corresponding to the warning mode. At subsequent step S319, the vehicle wireless CPU 36 sets a third counter C3, which is used for counting regarding a suspension period T3, to 0 and starts counting regarding the suspension period T3. At step S320, the vehicle wireless CPU 36 performs a warning mode notification process to notify that the remote control mode is the warning mode, and then ends this remote control mode control process. Specifically, the vehicle wireless CPU 36 transmits to the remote communication unit 53 using the selected antenna a notification signal in which information corresponding to the warning mode is set.

When the remote communication unit 53 receives the notification signal, the remote CPU 51 indicates using the touch panel 54 that the warning mode is active. For example, the remote CPU 51 displays on the operation screen G0 that the warning mode is active.

As shown in FIG. 9, when the current remote control mode is not the permission mode, the vehicle wireless CPU 36 determines that the outcome is NO at step S317. Then, at step S321, the vehicle wireless CPU 36 refers to the remote control mode identification information and determines whether the current remote control mode is the initial mode (that is, whether the initial mode is active).

When the current remote control mode is the initial mode, the vehicle wireless CPU 36 proceeds to step S325. When the current remote control mode is not the initial mode, that is, the current remote control mode is the warning mode or the prohibition mode, the vehicle wireless CPU 36 proceeds to step S322.

At step S322, the vehicle wireless CPU 36 refers to the remote control mode identification information and determines whether the current remote control mode is the warning mode (that is, whether the warning mode is active).

When the current remote control mode is not the warning mode, the vehicle wireless CPU 36 ends this remote control mode control process. When the current remote control mode is the warning mode, the vehicle wireless CPU 36 proceeds to step S323 and increments the third counter C3.

Then, at step S324, the vehicle wireless CPU 36 determines whether the third counter C3 is greater than or equal to a specified suspension value Cth3. The specified suspension value Cth3 is obtained by dividing the predetermined suspension period T3 by the specific interval Ta. The suspension period T3 is the period in which the warning mode is active.

The suspension period T3 is longer than the first determination period T1 and the second determination period T2, for example. Specifically, the suspension period T3 is set to be at least multiple times longer than the first determination period T1 and the second determination period T2. Thus, possibility determination is performed multiple times during the warning mode.

For example, the suspension period T3 may be shorter than a value obtained by dividing the difference between the second distance L2 and a distance Lx corresponding to the threshold intensity RSth by the maximum speed of the forklift 20 during remote control.

When the third counter C3 is less than the specified suspension value Cth3, the vehicle wireless CPU 36 ends the remote control mode control process and maintains the warning mode. When the third counter C3 is greater than or equal to the specified suspension value Cth3, the vehicle wireless CPU 36 proceeds to steps S325 and S326 and performs a process of switching the remote control mode from the warning mode to the prohibition mode.

Specifically, at step S325, the vehicle wireless CPU 36 performs a process of setting the remote control mode to the prohibition mode. That is, the vehicle wireless CPU 36 updates the remote control mode identification information to information corresponding to the prohibition mode.

At step S325, the vehicle wireless CPU 36 controls the signal conversion portion 33 so that a control signal SGa corresponding to stopping is sent to the vehicle CPU 27 through the interface 34. Upon receiving the control signal SGa corresponding to stopping, the vehicle CPU 27 drives the traveling actuator 25 to stop the forklift 20. Thus, when the remote control mode is switched from the warning mode to the prohibition mode while the forklift 20 is traveling, the forklift 20 stops at the position with the remote control relating to traveling prohibited.

At step S326, the vehicle wireless CPU 36 performs a prohibition mode notification process to notify that the remote control mode is the prohibition mode, and then ends this remote control mode control process. Specifically, the vehicle wireless CPU 36 transmits to the remote communication unit 53 using the selected antenna a notification signal in which information corresponding to the prohibition mode is set.

When the remote communication unit 53 receives the notification signal, the remote CPU 51 indicates using the touch panel 54 that the prohibition mode is active. For example, the remote CPU 51 displays on the operation screen G0 that the prohibition mode is active.

As described above, since the remote control mode control process is performed periodically at the specific intervals Ta, the vehicle wireless CPU 36 periodically acquires the received radio wave intensity RS at the specific intervals Ta. Each time the received radio wave intensity RS is acquired, the vehicle wireless CPU 36 compares the acquired received radio wave intensity RS with the threshold intensity RSth. The two determination periods T1 and T2 are set to be at least twice as long as the specific interval Ta, resulting in the identification of the received radio wave intensity RS and the comparison between the received radio wave intensity RS and the threshold intensity RSth performed multiple times before the result of each possibility determination is obtained.

The processes of steps S305, S307 and S315 correspond to "possibility determination" or a "possibility determination step." The vehicle wireless CPU 36, which performs the processes of steps S305, S307 and S315, corresponds to a "possibility determination portion." The vehicle wireless CPU 36, which performs the process of step S305, corresponds to a "comparison portion." The vehicle wireless CPU 36, which performs the processes of steps S101, S308, S318 and S325, corresponds to a "remote control mode control portion." The vehicle wireless CPU 36, which performs the processes of steps S102 and S312, corresponds to an "antenna selection portion." The vehicle wireless CPU 36, which performs the processes of steps S311 and S313, corresponds to a "switching prohibition portion." That is, the forklift 20 includes the "acquisition portion," the "possibility determination portion," and other portions.

The threshold intensity RSth corresponds to the "first threshold intensity" and the "second threshold intensity." In other words, the "first threshold intensity" is identical to the "second threshold intensity."

During remote control, the remote control device 50 (specifically, the remote communication unit 53) transmits remote control signals SGb continually at the specific intervals Ta regardless of the remote control mode. For example, the remote communication unit 53 periodically transmits remote control signals SGb even when the remote control mode is the prohibition mode. As such, even when the remote control mode is the prohibition mode, the remote control device 50 exchanges signals with the forklift 20.

The vehicle wireless CPU 36 performs the remote control mode control process upon receiving each remote control signal SGb, such that the remote control mode control process is performed even when the remote control mode is the prohibition mode.

When the current remote control mode is the prohibition mode, the vehicle wireless CPU 36 periodically performs possibility determination in the remote control mode control process. That is, the vehicle wireless CPU 36 periodically performs possibility determination regardless of the remote control mode.

When a possibility determination result is within the prohibition range A2, the vehicle wireless CPU 36 maintains the prohibition mode. When a possibility determination result is within the permission range A1, the vehicle wireless CPU 36 switches the remote control mode from the prohibition mode to the permission mode. In other words, the condition for switching from the prohibition mode to the permission mode is that the result of possibility determination becomes within the permission range A1 when the remote control mode is the prohibition mode. However, the condition for switching from the prohibition mode to the permission mode is not limited to this and may be any condition.

When possibility determination is completed and the possibility determination flag is set to OFF, the next possibility determination is performed in the remote control mode control process following the remote control mode control process in which the possibility determination flag is set to OFF. The possibility determination is performed repeatedly regardless of the remote control mode. That is, the industrial vehicle remote control system 10 is configured to perform possibility determination repeatedly in all remote control modes.

Figure 10:
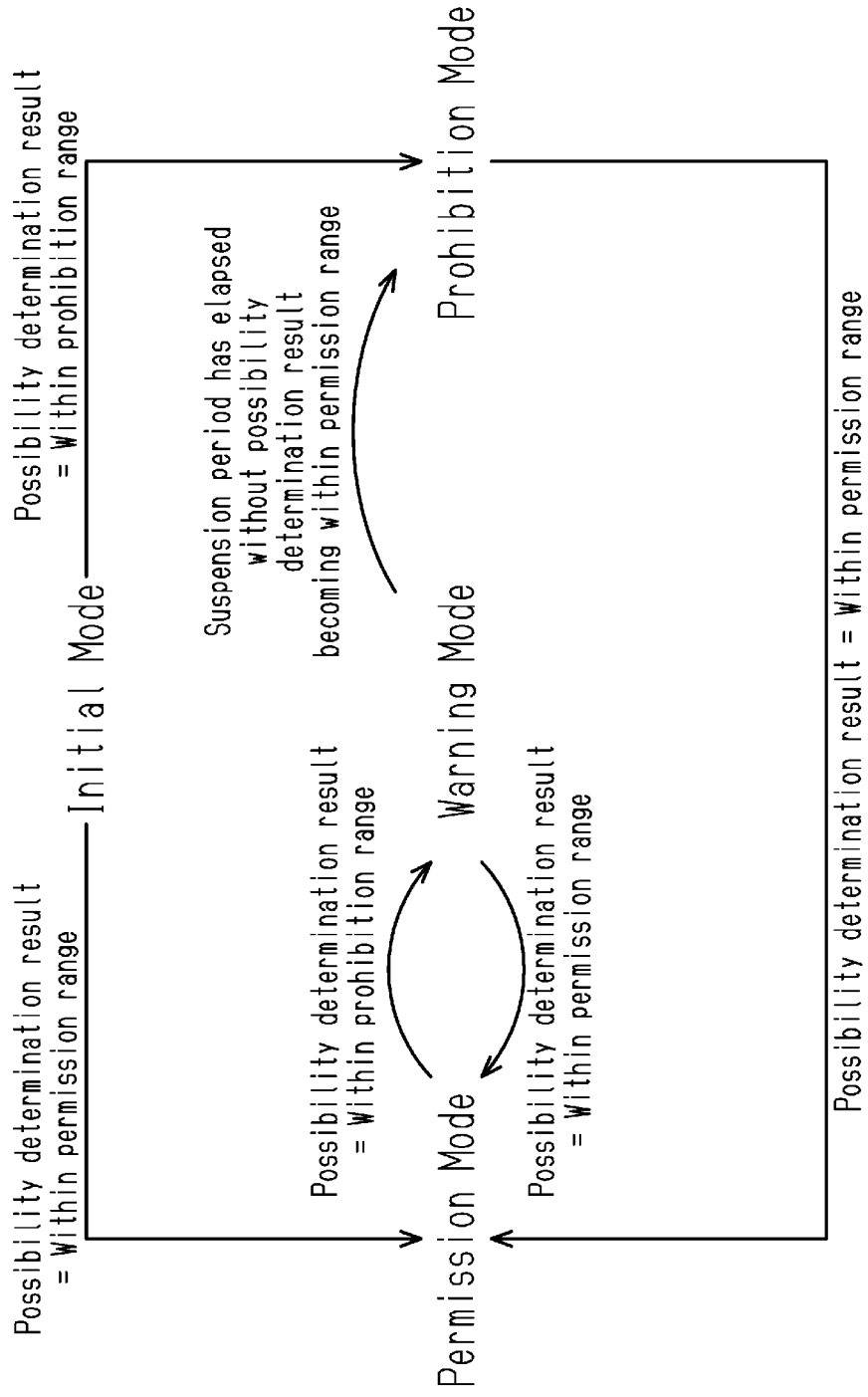
FIG. 10 is a diagram for illustrating the correlation between the remote control modes.

Referring to FIG. 10, the correlation between the remote control modes, which are activated by the remote control mode control process, is now described.

As shown in FIG. 10, when the result of possibility determination becomes within the prohibition range A2 during the permission mode, the remote control mode is switched from the permission mode to the warning mode.

When the result of possibility determination becomes within the permission range A1 during the warning mode, the remote control mode is switched from the warning mode to the permission mode. That is, the permission mode transition condition for switching the remote control mode from the warning mode to the permission mode is that the result of possibility determination becomes within the permission range A1 during the warning mode.

During the warning mode, when the suspension period T3 has elapsed without the result of possibility determination becoming within the permission range A1, the remote control mode is switched from the warning mode to the prohibition mode. That is, the prohibition mode transition condition for switching from the warning mode to the prohibition mode is that the suspension period T3 has elapsed since the permission mode is switched to the warning mode (A), and that the result of possibility determination does not become within the permission range A1 before the suspension period T3 has elapsed (B). The condition (B) may be considered as a situation in which possibility determination results are all within the prohibition range A2 during the suspension period T3.

As described above, the possibility determination is performed even during the prohibition mode. When the result of possibility determination becomes within the permission range A1 during the prohibition mode, the remote control mode is switched from the prohibition mode to the permission mode.

When the remote control mode is the initial mode, the remote control mode is switched to a different mode depending on the first possibility determination result. Specifically, when the possibility determination result is within the permission range A1, the remote control mode is switched from the initial mode to the permission mode. When the possibility determination result is within the prohibition range A2, the remote control mode is switched from the initial mode to the prohibition mode. The industrial vehicle remote control system 10 is configured to prevent switching to the initial mode from the permission mode, the warning mode, or the prohibition mode.

Operation of the first embodiment will now be described.

First, a situation in which the remote control mode is the permission mode and a situation in which the remote control mode is the prohibition mode are described.

Figure 11:
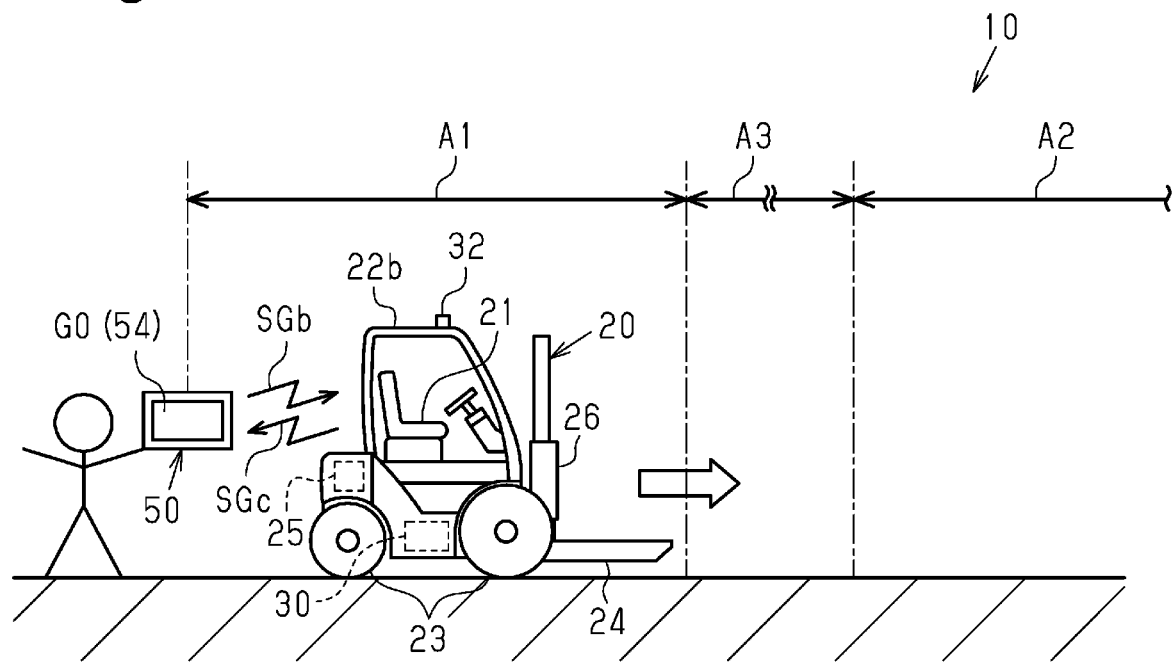
FIG. 11 is a schematic diagram showing the remote control device and the forklift in the permission range.
Figure 12:
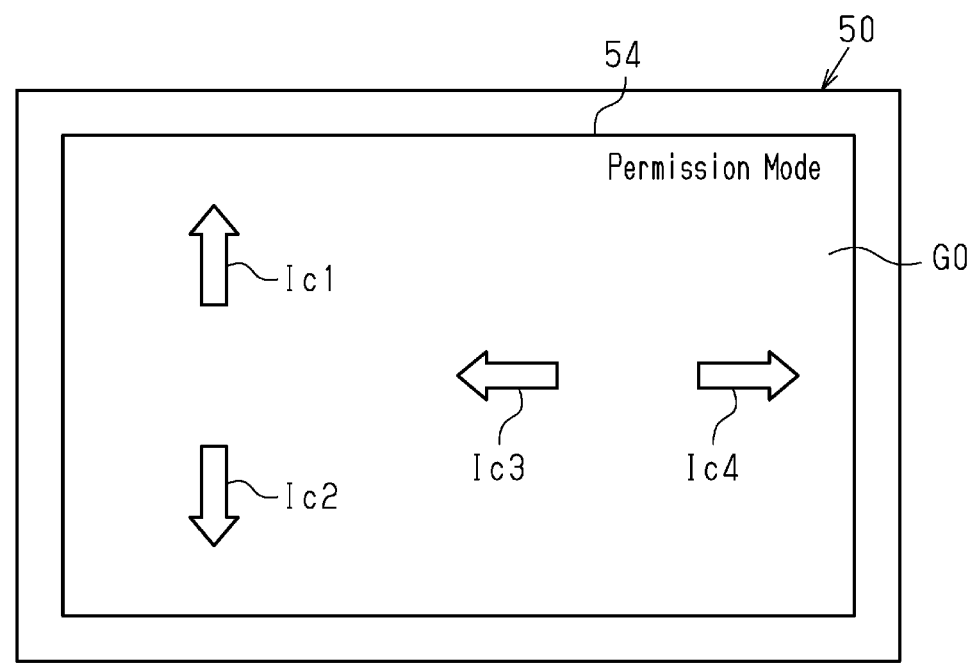
FIG. 12 is a front view showing the remote control device displaying the operation screen for the permission mode.

As shown in FIG. 11, when the forklift 20 is relatively close to the remote control device 50, specifically, when the forklift 20 is in the permission range A1, the remote control mode is set to the permission mode. The forklift 20 is thus remotely operable using the remote control device 50. As shown in FIG. 12, when the remote control mode is the permission mode, the operation screen G0 includes an indication showing that the permission mode is active. This allows the operator to identify that the permission mode is active and that remote control using the remote control device 50 is permitted.

Figure 13:
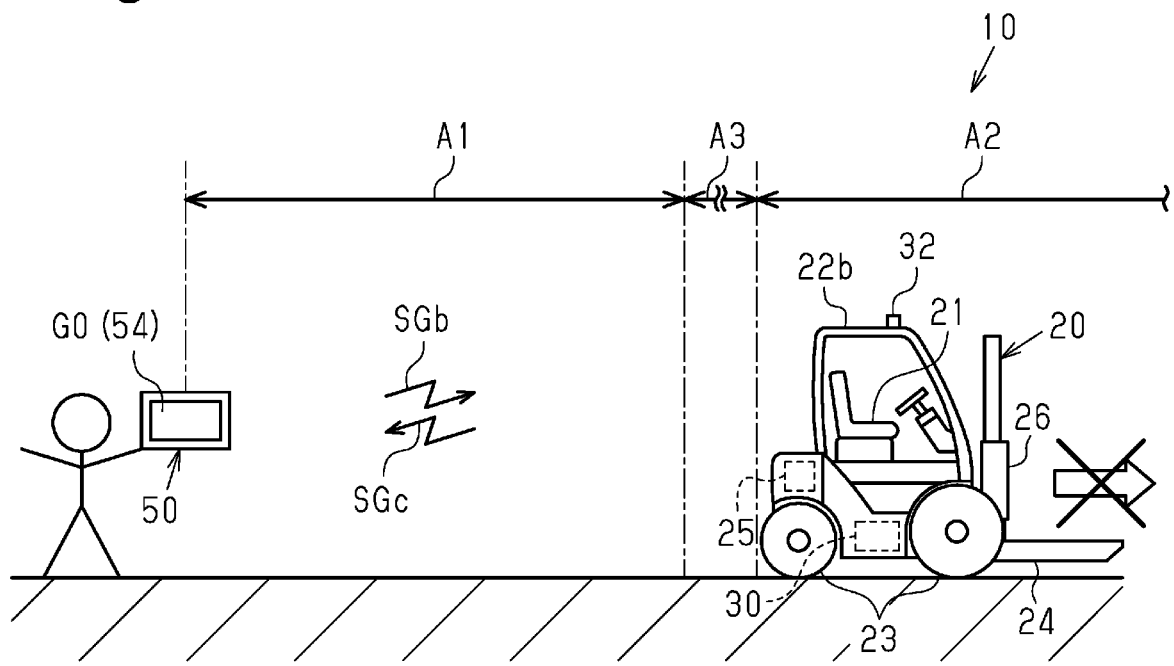
FIG. 13 is a schematic diagram showing the remote control device and the forklift in the prohibition range.
Figure 14:
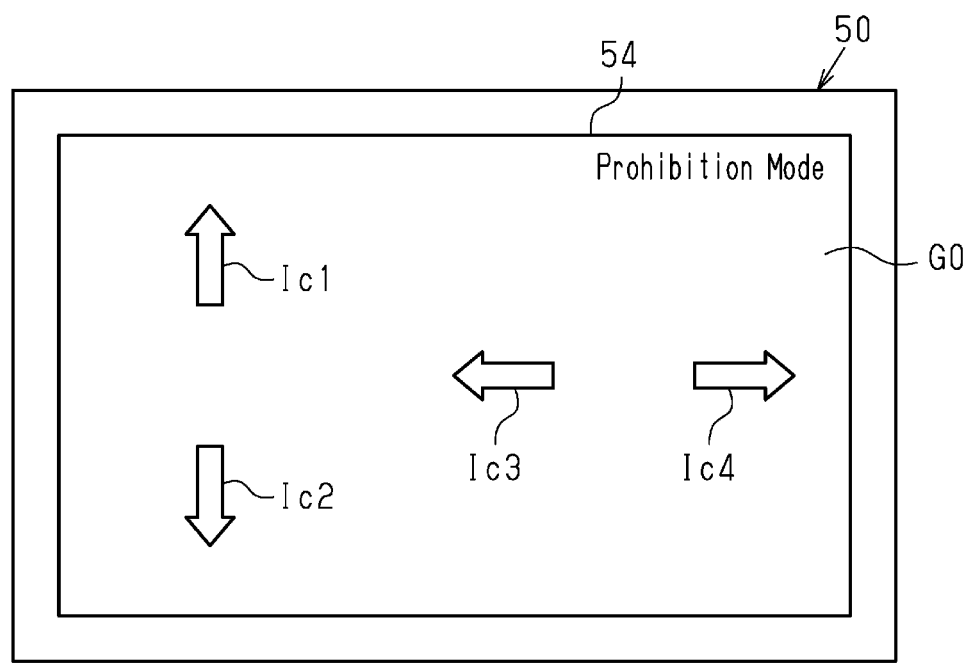
FIG. 14 is a front view showing the remote control device displaying the operation screen for the prohibition mode.

In contrast, as shown in FIG. 13, when the forklift 20 is relatively far from the remote control device 50, specifically, when the forklift 20 is in the prohibition range A2, the remote control mode is switched from the permission mode to the warning mode and then to the prohibition mode. Remote control of the forklift 20 using the remote control device 50 is thus prohibited. As shown in FIG. 14, when the remote control mode is the prohibition mode, the operation screen G0 includes an indication showing that the prohibition mode is active. This allows the operator to identify that the prohibition mode is active and that remote control using the remote control device 50 is prohibited.

Remote control of the forklift 20 using the remote control device 50 is confined to the range in which the operator can clearly see the forklift 20 (the permission range A1 or the error accommodation range A3). The forklift 20 located outside this range (i.e., in the prohibition range A2) cannot be remotely controlled. That is, the industrial vehicle remote control system 10 confines remote control of the forklift 20 using the remote control device 50 to the range that is smaller than the communication range A0 of the two communication units 30 and 53.

Figure 15:
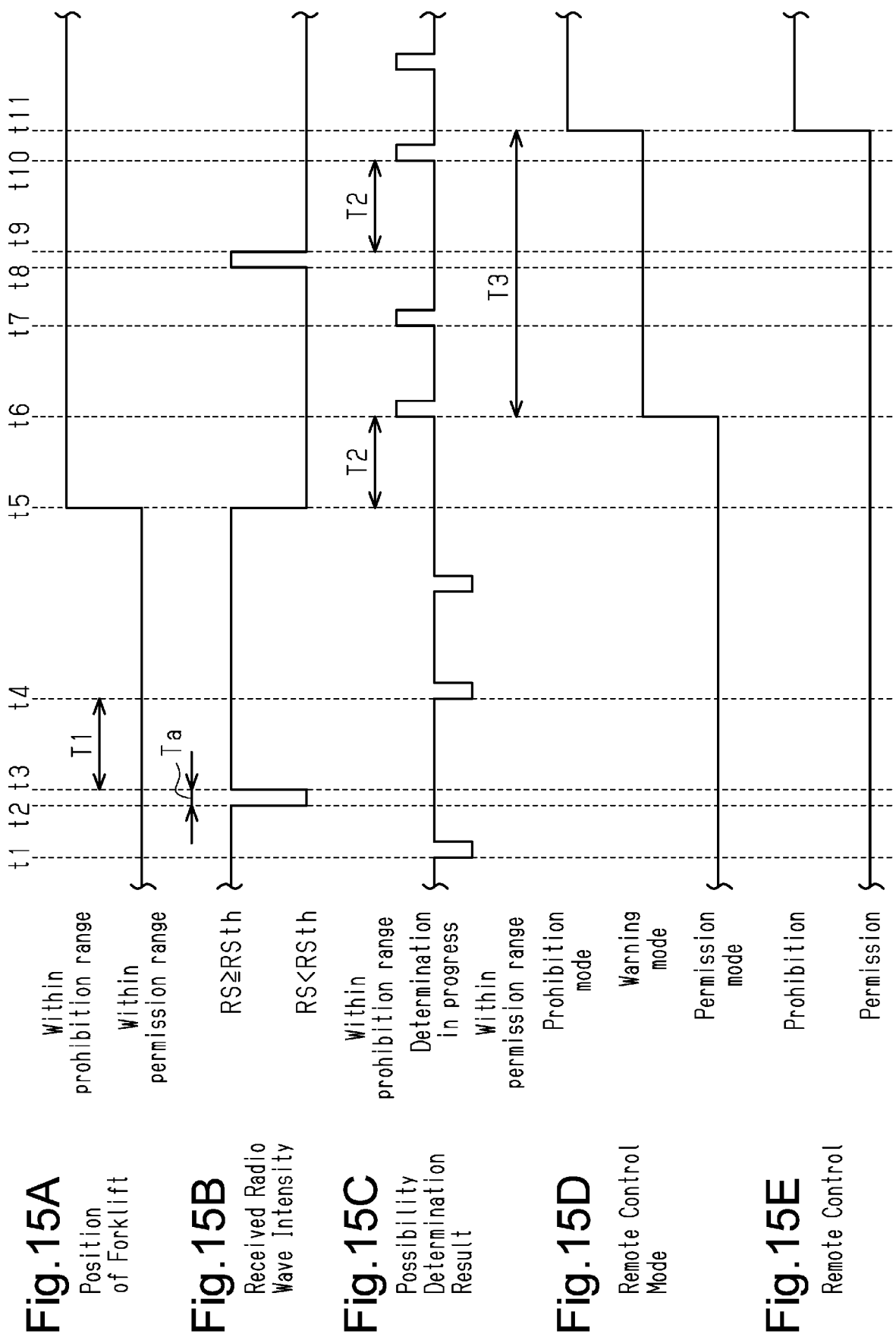
FIG. 15A is a timing diagram indicating the position of the forklift.
FIG. 15B is a timing diagram indicating the received radio wave intensity.
FIG. 15C is a timing diagram indicating the possibility determination result.
FIG. 15D is a timing diagram indicating the remote control mode.
FIG. 15E is a timing diagram indicating permission/prohibition of remote control.
Figure 16:
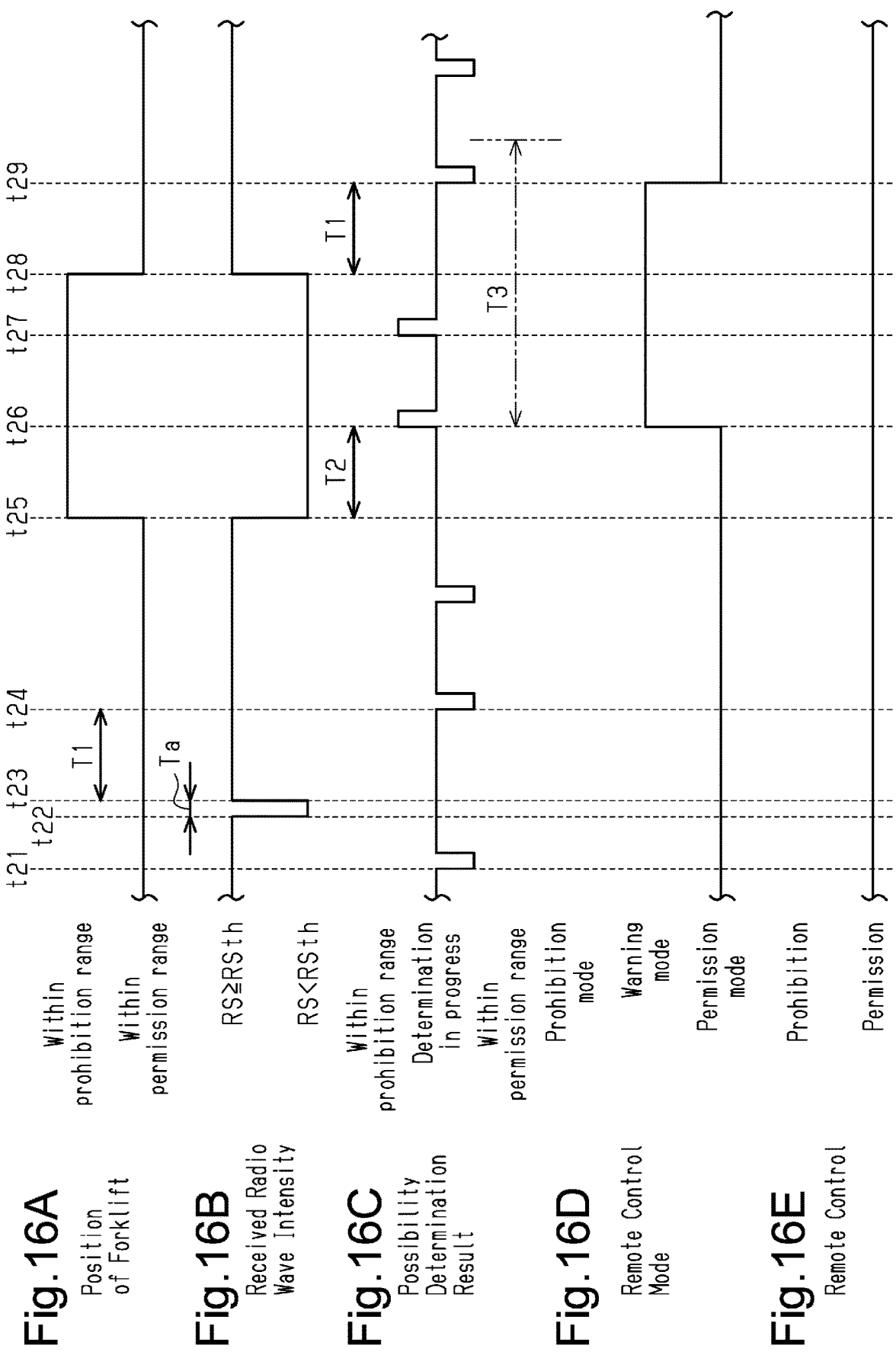
FIG. 16A is a timing diagram indicating the position of the forklift.
FIG. 16B is a timing diagram indicating the received radio wave intensity.
FIG. 16C is a timing diagram indicating the possibility determination result.
FIG. 16D is a timing diagram indicating the remote control mode.
FIG. 16E is a timing diagram indicating permission/prohibition of remote control.

Referring to FIGS. 15A to 16E, the manner in which the remote control mode is switched is described below. FIGS. 15 and 16 are timing diagrams showing how each element changes as the forklift 20 moves. FIG. 15A indicates the position of the forklift 20. FIG. 15B indicates the result of comparison between the received radio wave intensity RS and the threshold intensity RSth. FIG. 15C indicates the result of possibility determination. FIG. 15D indicates the remote control mode. FIG. 15E indicates the possibility (permission/prohibition) of remote control. FIG. 16A indicates the position of the forklift 20. FIG. 16B indicates the result of comparison between the received radio wave intensity RS and the threshold intensity RSth. FIG. 16C indicates the result of possibility determination. FIG. 16D indicates the remote control mode. FIG. 16E indicates the possibility (permission/prohibition) of remote control. For the illustration purposes, the ratio of the periods T1 to T3 and the specific interval Ta shown is different from the actual ratio.

Referring to FIG. 15, the first pattern is now described. As shown in FIG. 15A, in the first pattern, the forklift 20 moves from the permission range A1 to the prohibition range A2 and stays within the prohibition range A2.

First, as shown in FIG. 15A, the forklift 20 is in the permission range A1 at a time point t1. In this case, as shown in FIGS. 15B and 15C, the received radio wave intensity RS is greater than or equal to the threshold intensity RSth, and the result of possibility determination is within the permission range A1. As shown in FIG. 15D, the remote control mode is thus the permission mode. Accordingly, as shown in FIG. 15E, remote control is permitted.

Then, as shown in FIGS. 15A and 15B, at a time point t2, even though the forklift 20 is within the permission range A1, the received radio wave intensity RS becomes less than the threshold intensity RSth due to an error in the received radio wave intensity RS. This resets the first counter C1 and starts the counting of the second counter C2.

As shown in FIG. 15C, this does not cause the result of possibility determination to immediately become within the prohibition range A2 since the conditions for possibility determination include the durations (the first determination period T1 and the second determination period T2). As shown in FIGS. 15D and 15E, the remote control mode remains to be the permission mode, and remote control using the remote control device 50 remains permitted.

Then, at a time point t3, at which the specific interval Ta has elapsed since the time point t2, the received radio wave intensity RS becomes greater than or equal to the threshold intensity RSth. That is, the determination result in a remote control mode control process indicates that the received radio wave intensity RS is less than the threshold intensity RSth, and then the determination result in the next remote control mode control process indicates that the received radio wave intensity RS is greater than or equal to the threshold intensity RSth. In this case, the counting of the first counter C1 restarts at the time point t3. Then, at a time point t4, at which the first determination period T1 has elapsed since the time point t3, a possibility determination result within the permission range A1 is obtained.

Then, as shown in FIG. 15A, at a time point t5, the forklift 20 moves from the permission range A1 to the prohibition range A2. In this case, as shown in FIG. 15B, the received radio wave intensity RS becomes less than the threshold intensity RSth. This starts the counting regarding the second determination period T2.

Then, as shown in FIG. 15C, at a time point t6, at which the second determination period T2 has elapsed since the time point t5, a possibility determination result within the prohibition range A2 is obtained. As shown in FIG. 15D, the remote control mode is thus switched from the permission mode to the warning mode. In this case, as shown in FIG. 15E, the remote control remains permitted.

Then, as shown in FIG. 15C, at a time point t7, the first possibility determination result during the warning mode is obtained. This possibility determination result is within the prohibition range A2. Thus, the remote control mode is not switched to the permission mode and remains to be the warning mode.

As shown in FIG. 15B, at a time point t8, the received radio wave intensity RS temporarily becomes greater than or equal to the threshold intensity RSth due to an error in the received radio wave intensity RS. Then, at a time point t9, at which the specific interval Ta has elapsed since the time point t8, the received radio wave intensity RS again becomes less than the threshold intensity RSth. In this case, at the time point t8, the counting of the second counter C2 is reset, and the counting of the first counter C1 starts. Then, at the time point t9, the counting of the first counter C1 is reset, and the counting of the second counter C2 starts.

As shown in FIG. 15C, this does not cause the result of possibility determination to immediately become within the permission range A1 at the time point t8 since the conditions for possibility determination include the durations (the first determination period T1 and the second determination period T2). As shown in FIG. 15D, the remote control mode thus remains to be the warning mode.

Then, at a time point t10, at which the second determination period T2 has elapsed since the time point t9, a possibility determination result corresponding to the prohibition range A2 is obtained. In this case, the remote control mode is not switched to the permission mode and remains to be the warning mode.

Then, as shown in FIG. 15D, at a time point t11, at which the suspension period T3 has elapsed since the remote control mode is switched to the warning mode, the remote control mode is switched from the warning mode to the prohibition mode. Accordingly, as shown in FIG. 15E, remote control is prohibited.

When the forklift 20 moves from the permission range A1 to the prohibition range A2, the predetermined suspension period T3 is provided before the remote control is prohibited. That is, the prohibition range A2 is not a range that causes immediate prohibition of remote control when the forklift 20 enters the prohibition range A2. Rather, the prohibition range A2 is a range that causes prohibition of remote control after the predetermined suspension period T3.

Referring to FIGS. 16A to 16E, the second pattern is now described. As shown in FIG. 16A, in the second pattern, the forklift 20 moves from the permission range A1 to the prohibition range A2 and then, during the suspension period T3, moves from the prohibition range A2 to the permission range A1.

As shown in FIGS. 16A to 16E, the behaviors from a time point t21 to a time point t27 are the same as those from the time point t1 to the time point t7.

In the second pattern, when the remote control mode is switched to the warning mode, the operator operates the forklift 20 to be closer to the remote control device 50. In this case, as shown in FIGS. 16A and 16D, at a time point t28, which is before the suspension period T3 has elapsed since the remote control mode is switched to the warning mode, the forklift 20 moves from the prohibition range A2 to the permission range A1. Accordingly, as shown in FIG. 16B, the received radio wave intensity RS becomes greater than or equal to the threshold intensity RSth.

Then, at a time point t29, at which the first determination period T1 has elapsed since the time point t28, a possibility determination result within the permission range A1 is obtained. As shown in FIG. 16D, the remote control mode is thus switched from the warning mode to the permission mode. This avoids prohibition of remote control.

The first embodiment has the following advantages.

(1) The industrial vehicle remote control system 10 includes the forklift 20, which includes the vehicle communication unit 30, and the remote control device 50, which includes the remote communication unit 53 and is used for remote control of the forklift 20. The vehicle wireless CPU 36 of the industrial vehicle remote control system 10 acquires the received radio wave intensity RS of the remote control signal SGb communicated wirelessly between the two communication units 30 and 53 and performs possibility determination based on the identification result. The possibility determination is a process in which the forklift 20 is determined to be in the permission range A1 when a state in which the received radio wave intensity RS is greater than or equal to the threshold intensity RSth continues for the first determination period T1, and in which the forklift 20 is determined to be in the prohibition range A2 when a state in which the received radio wave intensity RS is less than the threshold intensity RSth continues for the second determination period T2. In the permission range A1, remote control relating to traveling using the remote control device 50 is permitted. In the prohibition range A2, remote control relating to traveling using the remote control device 50 is prohibited even under conditions where the wireless communication between the two communication units 30 and 53 is performed.

This configuration determines, based on the received radio wave intensity RS, whether the forklift 20 is in the permission range A1 or in the prohibition range A2. The prohibition range A2 is farther than the permission range A1. This configuration limits remote control relating to traveling of the forklift 20 when the operator operating the remote control device 50 is excessively far from the forklift 20 and cannot clearly see the forklift 20. This limits an error in operation relating to traveling of the forklift 20, thereby improving the safety.

In particular, the prohibition range A2 is a range in which remote control relating to traveling using the remote control device 50 is prohibited even under conditions where the wireless communication between the two communication units 30 and 53 is performed. Thus, even when the communication range A0 is larger than the appropriate range (e.g., the range that allows the operator to perform remote control relating to traveling while clearly seeing the forklift 20), the range in which remote control relating to traveling using the remote control device 50 is permitted is limited to the appropriate range. This improves the safety.

Further, the possibility determination involves the condition that a state in which the received radio wave intensity RS is greater than or equal to the threshold intensity RSth continues for the first determination period T1, and the condition that a state in which the received radio wave intensity RS is less than the threshold intensity RSth continues for the second determination period T2. Thus, even when an error in the received radio wave intensity RS causes erroneous determination in the comparison between the received radio wave intensity RS and the threshold intensity RSth, the result of possibility determination is unlikely to be incorrect. This increases the accuracy of the result of possibility determination even when the received radio wave intensity RS has an error. Thus, an error in the received radio wave intensity RS is less likely to result in an incorrect possibility determination result. That is, a situation in which the result of possibility determination is within the prohibition range A2 even though the forklift 20 is in the permission range A1, and a situation in which the result of possibility determination is within the permission range A1 even though the forklift 20 is in the prohibition range A2 are unlikely to occur.

The prohibition range may be a range that causes remote control relating to traveling to be prohibited immediately when the industrial vehicle enters the prohibition range. Alternatively, the prohibition range may be a range that causes remote control relating to traveling to be prohibited after a lapse of the predetermined suspension period when the industrial vehicle enters the prohibition range. Further, the first determination period and the second determination period may be either identical or different.

(2) The received radio wave intensity RS is used as the parameter for acquiring the distance between the remote control device 50 and the forklift 20. The received radio wave intensity RS is attenuated not only by the distance between the two communication units 30 and 53 but also by any obstacle. As such, the forklift 20 can be determined to be in the prohibition range A2 when there is an obstacle between the operator and the forklift 20, causing the remote control relating to traveling of the forklift 20 to be prohibited. Thus, it is possible to prohibit remote control relating to traveling when the forklift 20 enters the blind area for the operator due to an obstacle, for example. This helps to prevent incorrect remote control relating to traveling.

In this respect, the permission range A1 may be considered as a range of strong radio waves where the received radio wave intensity RS is greater than or equal to the threshold intensity RSth, and the prohibition range A2 may be considered as a range of weak radio waves where the received radio wave intensity RS is less than threshold intensity RSth.

(3) The permission range A1 is smaller than the communication range A0, in which the two communication units 30 and 53 can communicate wirelessly. This configuration confines remote control relating to traveling to the permission range A1 regardless of the size of the communication range A0.

Moreover, remote control relating to traveling is performed stably through wireless communication, thereby improving the safety. Specifically, the communication condition tends to be unstable in the periphery of the communication range A0. As such, if the entire communication range A0 is the permission range A1 and the area outside the communication range A0 is the prohibition range A2, the forklift 20 would be less responsive when located in the periphery. In contrast, in the first embodiment, the permission range A1 is smaller than the communication range A0, increasing the stability of the communication condition during remote control. This allows remote control relating to traveling of the forklift 20 to be performed in a desirable manner.

(4) The wireless communication system of the two communication units 30 and 53 is a wireless LAN system conforming to the IEEE 802.11 standard (in other words, the Wi-Fi system), and the remote control device 50 may be a mobile phone, a smartphone, a tablet terminal, or a virtual reality terminal. This configuration allows for the use of a general wireless communication system and existing general-purpose products for remote control relating to traveling of the forklift 20.

For example, the remote control range can be set to an appropriate range by setting the communication range A0 to this appropriate range. However, when a general wireless communication system and general-purpose products are used as described above, the communication range A0 tends to be larger than the appropriate range. Nevertheless, use of a specialized product designed to set the communication range A0 to the appropriate range is not desirable in terms of cost, for example. In this regard, the first embodiment appropriately sets the range in which remote control relating to traveling is possible, while using a general wireless communication system and general-purpose products.

(5) The vehicle wireless CPU 36 of the vehicle communication unit 30 periodically acquires the received radio wave intensity RS at the specific intervals Ta. Each time the received radio wave intensity RS is acquired, the vehicle wireless CPU 36 compares the acquired received radio wave intensity RS with the threshold intensity RSth. The two determination periods T1 and T2 are set to be at least twice as long as the specific interval Ta. With this configuration, the result of possibility determination is obtained when the results of comparison between the received radio wave intensity RS and the threshold intensity RSth are identical on successive occasions. This increases the accuracy of the result of possibility determination.

When the first threshold intensity and the second threshold intensity are identical, the phrase "compares the received radio wave intensity with the first threshold intensity and the second threshold intensity" indicates that the received radio wave intensity is compared with one threshold intensity.

(6) The remote communication unit 53 of the remote control device 50 transmits remote control signals SGb at the specific intervals Ta. Each time the vehicle communication unit 30 receives a remote control signal SGb, the vehicle wireless CPU 36 provided in the forklift 20 acquires the received radio wave intensity RS of the received remote control signal SGb. This configuration performs possibility determination based on the received radio wave intensity RS without transmitting or receiving specialized signals. This avoids complication of transmission and reception of signals between the two communication units 30 and 53, which would otherwise occur if specialized signals are transmitted and received.

(7) Even after a possibility determination result corresponding to the prohibition range A2 is obtained, the remote communication unit 53 transmits remote control signals SGb to the vehicle communication unit 30 at the specific intervals Ta.

As described above, when the result of possibility determination is within the prohibition range A2, remote control using the remote control device 50 is prohibited. In this state, transmitting remote control signals SGb serves no purpose in the majority of times. As such, in a conventional configuration, the remote communication unit 53 would stop transmitting remote control signals SGb when the result of possibility determination is within the prohibition range A2. This disables possibility determination based on the received radio wave intensity RS, inconveniently preventing possibility determination and remote control even if the operator moves the forklift 20 into the permission range A1.

In contrast, the first embodiment continues to transmit remote control signals SGb even when the result of possibility determination is within the prohibition range A2, allowing possibility determination to be performed even after remote control using the remote control device 50 is prohibited. This allows the position of the forklift 20 to be identified.

(8) The vehicle communication unit 30 includes the first antenna 31 and the second antenna 32. The vehicle wireless CPU 36 selects one of the two antennas 31 and 32 and transmits and receives signals (remote control signals SGb and return signals SGc) using the selected antenna. The vehicle wireless CPU 36 acquires the received radio wave intensity RS of the remote control signal SGb received by the selected antenna.

In this configuration, the vehicle wireless CPU 36 switches the selected antenna when the received radio wave intensity RS becomes less than the threshold intensity RSth during possibility determination. For example, the vehicle wireless CPU 36 switches the selected antenna from the first antenna 31 to the second antenna 32 when the received radio wave intensity RS becomes less than the threshold intensity RSth while the first antenna 31 is selected, and uses the second antenna 32 to receive the subsequent remote control signals SGb. Even if one of the two antennas 31 and 32 is located in a null where the received radio wave intensity RS is locally reduced, the configuration can use the other antenna to perform accurate possibility determination.

(9) When the selected antenna is switched the predetermined specified number of times (once in this example) during possibility determination, the vehicle wireless CPU 36 prohibits switching of the selected antenna until this possibility determination ends. This configuration limits lengthening of the time needed for possibility determination caused by switching of the selected antenna.

In particular, in order to increase the accuracy of the result of possibility determination, the first embodiment uses the two determination periods T1 and T2 as the conditions for possibility determination. This tends to lengthen the time required for possibility determination. If the selected antenna is switched too often in this configuration, the possibility determination would require more time, causing the result of possibility determination to fail to follow the movement of the forklift 20. In contrast, the first embodiment avoids excessively frequent switching of the selected antenna, helping to prevent the problem resulting from the use of the determination periods T1 and T2 as the conditions for possibility determination.

(10) The forklift 20 has the driver seat 21 and the roof 22b covering the driver seat 21 from above, and the first antenna 31 and the second antenna 32 are apart from each other on the roof 22b. This configuration secures the distance between the two antennas 31 and 32. Thus, the two antennas 31 and 32 are unlikely to be simultaneously located in a null or to interfere with each other. In addition, the antennas 31 and 32 are mounted on the roof 22b, which is located at a relatively high position in the forklift 20, and thus receive radio waves easily. This achieves the suitable wireless communication using the remote control device 50.

(11) The industrial vehicle remote control system 10 (i.e., the remote control device 50 or the forklift 20) has a plurality of remote control modes using the remote control device 50. The plurality of remote control modes using the remote control device 50 includes the permission mode and the warning mode (or the suspension mode), which permit remote control relating to traveling, and the prohibition mode, which prohibits remote control relating to traveling even under conditions where the wireless communication between the two communication units 30 and 53 is performed.

In this configuration, the vehicle wireless CPU 36 switches the remote control mode from the permission mode to the warning mode when the result of possibility determination becomes within the prohibition range A2 while the remote control mode is the permission mode. The vehicle wireless CPU 36 switches the remote control mode from the warning mode to the prohibition mode when the predetermined prohibition mode transition condition is satisfied during the warning mode. In addition, the vehicle wireless CPU 36 switches the remote control mode from the warning mode to the permission mode when the predetermined permission mode transition condition is satisfied during the warning mode. When the forklift 20 moves from the permission range A1 to the prohibition range A2, this configuration does not immediately switch the remote control mode to the prohibition mode, which prohibits remote control relating to traveling, but first switches to the warning mode. This allows the operator to avoid prohibition of remote control relating to traveling by moving the forklift 20 into the permission range A1 during the warning mode. The configuration thus avoids inconvenience, which would otherwise occur if remote control relating to traveling is prohibited immediately, while limiting remote control relating to traveling performed from a position excessively far.

(12) The vehicle wireless CPU 36 performs possibility determination at least once during the warning mode. The permission mode transition condition is that the result of possibility determination becomes within the permission range A1 during the warning mode. This configuration performs another possibility determination during the warning mode, and if the result of the possibility determination is within the permission range A1, the remote control mode is switched from the warning mode to the permission mode. Thus, when the forklift 20 moves into the permission range A1 after the remote control mode is switched to the warning mode, the remote control mode is switched from the warning mode to the permission mode. This reduces the likelihood that the warning mode continues even though the forklift 20 has moved into the permission range A1.

(13) The prohibition mode transition condition is that the suspension period T3 has elapsed without the permission mode transition condition being satisfied since the remote control mode is switched from the permission mode to the warning mode. The suspension period T3 is longer than the determination periods T1 and T2. This configuration secures the time for the operator to move the forklift 20 from the prohibition range A2 to the permission range A1. This further increases the convenience.

For example, the prohibition mode transition condition can be that the received radio wave intensity RS becomes less than a second threshold intensity that is smaller than the threshold intensity RSth. However, in this case, the duration of the warning mode would vary depending on the movement speed of the forklift 20, an error in the received radio wave intensity RS, or other factors. This can excessively shorten the duration of the warning mode. The shortened duration can disadvantageously prohibit the remote control relating to traveling while the operator is trying to move the forklift 20 into the permission range A1. In this respect, the first embodiment uses the suspension period T3 as the prohibition mode transition condition and thus avoids this problem.

Further, the suspension period T3, which is longer than the determination periods T1 and T2, allows possibility determination to be performed at least once during the suspension period T3. Thus, it is unlikely that the remote control mode is switched from the warning mode to the prohibition mode without obtaining at least one possibility determination result during the suspension period T3.

(14) The remote control device 50 includes the touch panel 54 for indicating the current remote control mode. This configuration allows the operator to identify the current remote control mode. For example, when the remote control mode is switched from the permission mode to the warning mode, the operator may operate the forklift 20 to move it closer to the operator, or the operator may move toward the forklift 20. This reduces the likelihood of remote control relating to traveling being prohibited, improving the convenience.

(15) The received radio wave intensity RS decreases as the distance between the two communication units 30 and 53 increases. The prohibition range A2 at least includes a range that is separated from the remote control device 50 by the second distance L2 or more. In this configuration, the threshold intensity RSth is set higher than the received radio wave intensity RS corresponding to the second distance L2. The suspension period T3 is set less than a value obtained by dividing the difference between the second distance L2 and the distance corresponding to the threshold intensity RSth by the maximum speed of the forklift 20 during remote control.

This configuration reduces the likelihood that the forklift 20 moves to a position separated from the remote control device 50 by the second distance L2 or more before the suspension period T3 has elapsed since the remote control mode is switched to the warning mode.

Specifically, the forklift 20 moves to a position separated from the remote control device 50 by the distance corresponding to the threshold intensity RSth thereby causing the remote control mode to be switched to the warning mode.

Then, even if the forklift 20 travels away from the remote control device 50 at the maximum speed allowed during remote control, the suspension period T3 will elapse before the forklift 20 can reach to a position separated from the remote control device 50 by the second distance L2. This reduces that likelihood that remote control relating to traveling is performed on the forklift 20 that has moved during the suspension period T3 to a position where the forklift 20 is less visible. The configuration limits this problem, which may occur when remote control relating to traveling is permitted during the warning mode.

(16) The vehicle communication unit 30 includes the vehicle wireless memory 35, which stores the remote control program 40, and the vehicle wireless CPU 36. The vehicle wireless CPU 36 is configured to perform the signal conversion control process, which permits or prohibits remote control relating to traveling according to the remote control mode, and the remote control mode control process, which performs possibility determination and sets the remote control mode. This configuration provides advantage (1), for example, with a relatively simple process, such as adding or changing a communication unit, and without requiring a special process for the vehicle CPU 27 or the vehicle memory 28 of the forklift 20.

Second Embodiment

In the second embodiment, the remote control mode control process is performed by the remote control device 50. This is described below together with the specific configuration of the remote communication unit.

Figure 17:
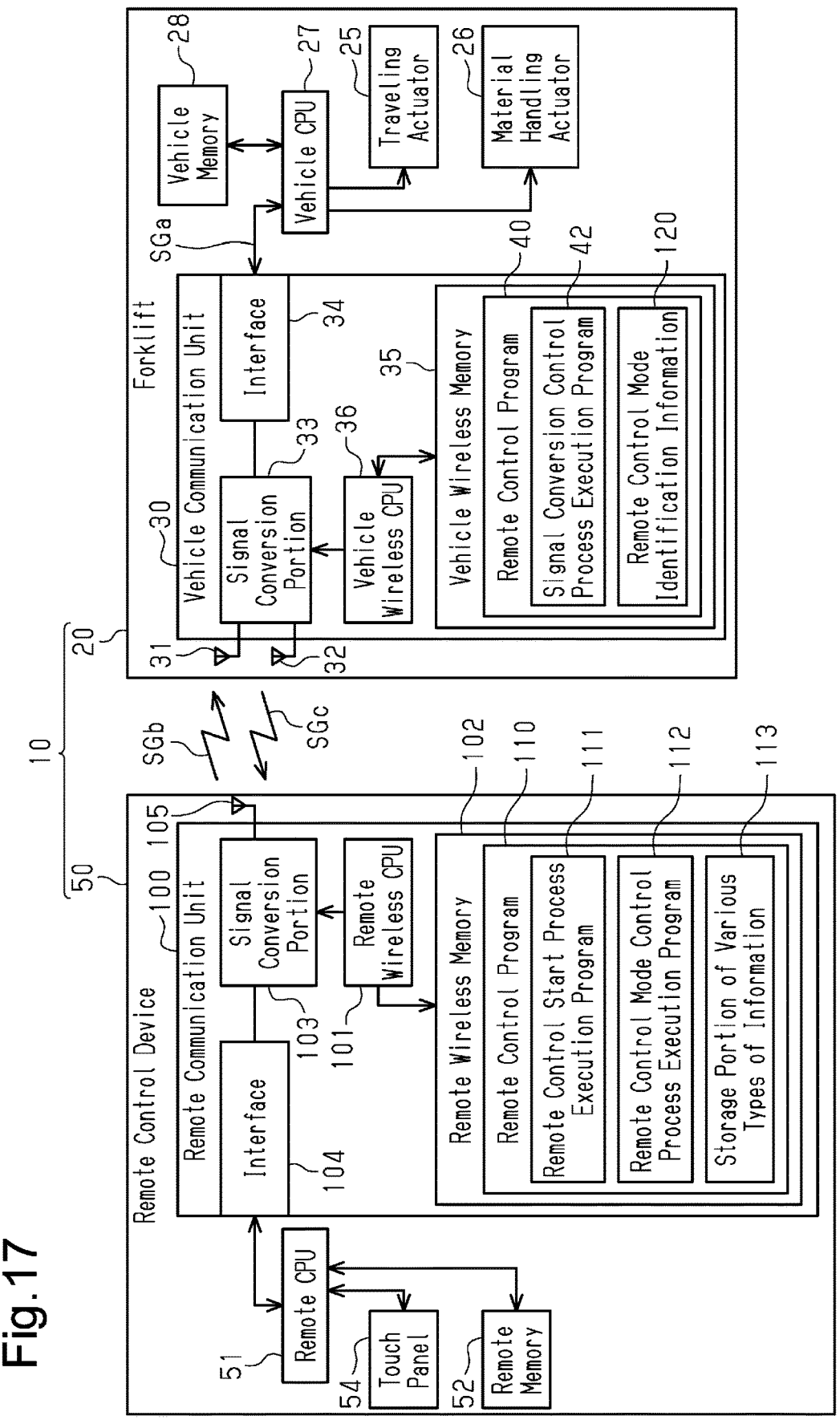
FIG. 17 is a block diagram showing the electrical configuration of an industrial vehicle remote control system of a second embodiment.

As shown in FIG. 17, the remote control device 50 has a remote communication unit 100, which includes a remote wireless CPU 101, a remote wireless memory 102 storing a remote control program 110, a signal conversion portion 103, an interface 104, and an antenna 105.

The signal conversion portion 103 is electrically connected to the remote CPU 51 via the interface 104 and connected to the antenna 105. The signal conversion portion 103 converts a control signal relating to remote control input from the remote CPU 51 into a remote control signal SGb for wireless communication. The remote control signal SGb is transmitted by the antenna 105. The signal conversion portion 103 converts a return signal SGc received by the antenna 105 into a control signal.

The remote wireless CPU 101 is configured to control the signal conversion portion 103 and to acquire the received radio wave intensity RS of the return signal SGc received by the antenna 105. Further, the remote wireless CPU 101 is electrically connected to the remote CPU 51 so as to exchange signals with the remote CPU 51.

The remote CPU 51 controls the display on the touch panel 54 such that, at the start of remote control, the operation screen G0 is displayed on the touch panel 54 and that the operation screen G0 includes an indication showing that the initial mode is active. In addition, the remote CPU 51 outputs to the remote wireless CPU 101 a start signal indicating that remote control is to be started.

Upon receiving the start signal, the remote wireless CPU 101 reads a remote control start process execution program 111 stored in the remote control program 110 and performs a remote control start process. In the remote control start process, the remote wireless CPU 101 transmits to the vehicle communication unit 30 a notification signal in which information corresponding to the initial mode is set. Upon receiving the notification signal, the vehicle communication unit 30 updates remote control mode identification information 120 in the vehicle wireless memory 35 to the information corresponding to the initial mode.

When remote control is started, the remote CPU 51 transmits control signals that relate to remote control and correspond to the manner of input operation on the touch panel 54 to the remote communication unit 100 at specific intervals Ta. As in the first embodiment, the remote communication unit 100 periodically transmits remote control signals SGb at the specific intervals Ta.

Upon receiving a remote control signal SGb from the remote communication unit 100, the vehicle communication unit 30 performs a signal conversion control process. Thus, when the remote control mode is the permission mode or the warning mode, the forklift 20 is operated according to the manner of operation on the remote control device 50. Further, a return signal SGc is transmitted each time the signal conversion control process is performed. The remote communication unit 100 thus receives return signals SGc at the specific intervals Ta.

Upon receiving each return signal SGc, the remote wireless CPU 101 reads a remote control mode control process execution program 112 stored in the remote control program 110 and performs a remote control mode control process using various types of information stored in a storage portion of various types of information 113. That is, in this embodiment, the remote wireless CPU 101 of the remote communication unit 100 corresponds to the "acquisition portion," the "possibility determination portion," and the "remote control mode control portion," for example. In other words, the remote control device 50 includes the "acquisition portion," "possibility determination portion," and other portions.

The remote control mode control process performed by the remote wireless CPU 101 is generally the same as that of the first embodiment.

In the process of step S304, the remote wireless CPU 101 acquires the received radio wave intensity RS of the return signal SGc received by the remote communication unit 100. That is, the remote wireless CPU 101 periodically acquires the received radio wave intensity RS of the return signal SGc and performs possibility determination based on the results. In this case, the remote wireless CPU 101 preferably acquires the transmitted intensity of the return signal SGc in advance.

In the antenna switching process of step S312, the remote wireless CPU 101 transmits an antenna switching request signal. When the selected antenna receives the switching request signal, the vehicle wireless CPU 36 switches the selected antenna.

Further, instead of the process of step S308, the remote wireless CPU 101 performs a process of transmitting to the vehicle communication unit 30 a notification signal in which information corresponding to the permission mode is set. When the notification signal is received through the remote communication unit 100, the vehicle wireless CPU 36 updates the remote control mode identification information 120 to the information corresponding to the permission mode.

Instead of the process of step S310, the remote wireless CPU 101 performs a process of issuing an instruction to the remote CPU 51 so that the operation screen G0 indicates that the permission mode is active. The remote CPU 51 controls the display of the operation screen G0 according to the instruction.

The processes of steps S318 and S320 and the processes of steps S325 and S326 are also changed in a similar manner as described above except that the target remote control mode is different.

The second embodiment has the following advantages.

(17) The remote control device 50, which is used to remotely control the forklift 20 having the vehicle communication unit 30, includes the remote communication unit 100, which communicates wirelessly with the vehicle communication unit 30. The remote wireless CPU 101 of the remote communication unit 100 acquires the received radio wave intensity RS of the return signal SGc received by the remote communication unit 100, and performs possibility determination based on the result. This configuration also has advantage (1), for example.

(18) The remote communication unit 100 transmits remote control signals SGb to the vehicle communication unit 30 at the specific intervals Ta. Upon receiving a remote control signal SGb, the vehicle communication unit 30 transmits a return signal SGc. The remote wireless CPU 101 provided in the remote control device 50 acquires the received radio wave intensity RS of the return signal SGc and performs possibility determination based on the result. In this configuration, successful transmission of the remote control signal SGb is identified when the return signal SGc is received. The use of a return signal SGc for possibility determination allows possibility determination to be performed based on the received radio wave intensity RS and without using a specialized signal.

Third Embodiment

The threshold information D1 of the third embodiment is updated when a predetermined update condition is satisfied. That is, the industrial vehicle remote control system 10 of the third embodiment is configured to update the threshold information D1 when the update condition is satisfied. This is described below in detail.

Figure 18:
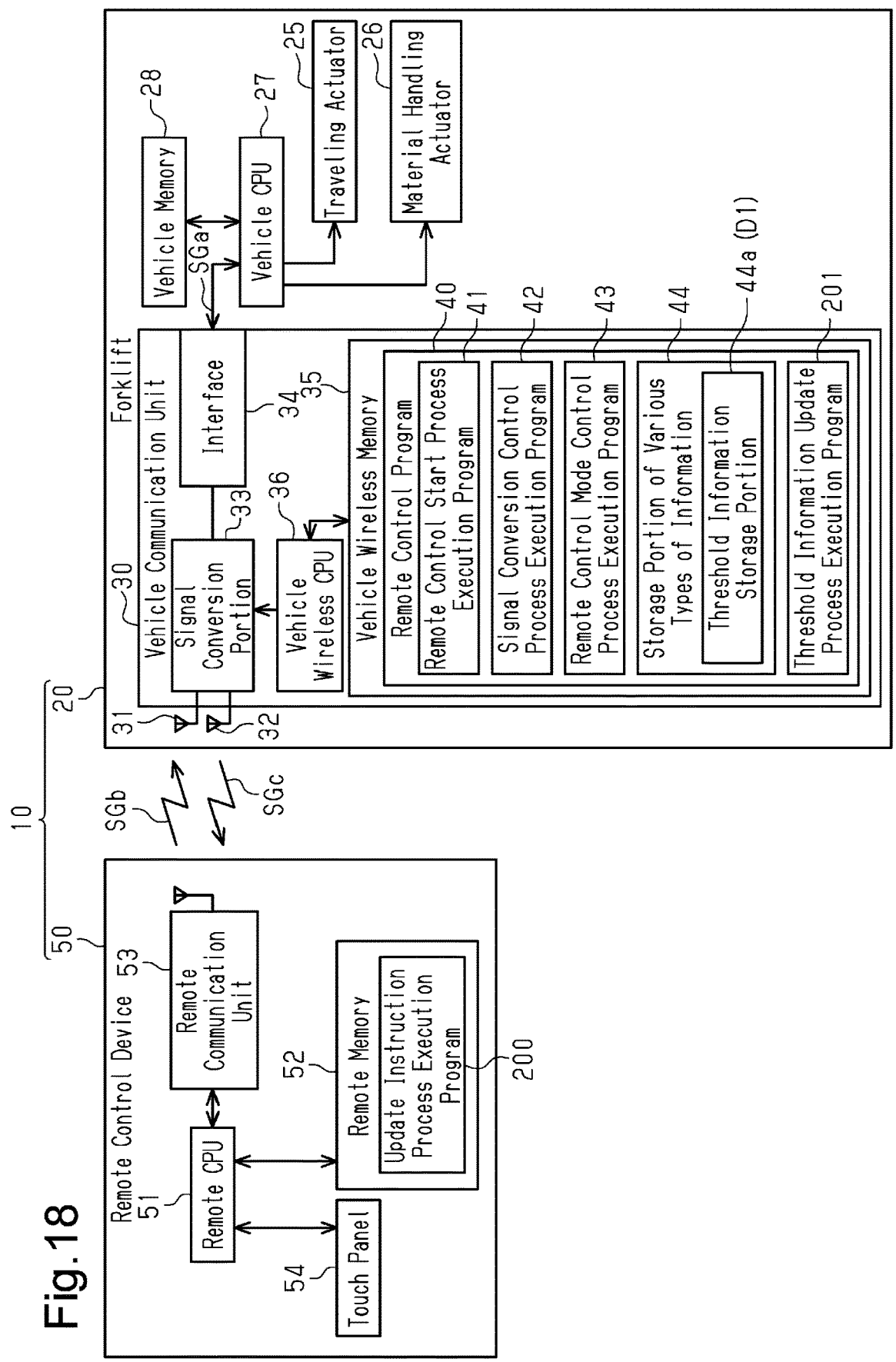
FIG. 18 is a block diagram showing the electrical configuration of an industrial vehicle remote control system of a third embodiment.

As shown in FIG. 18, the remote memory 52 stores an update instruction process execution program 200 for executing an update instruction process that instructs update of the threshold intensity RSth. When the update condition is satisfied, the remote CPU 51 reads the update instruction process execution program 200 and performs an update instruction process. The update instruction process transmits an update instruction signal for instructing update of the threshold information D1 to the vehicle communication unit 30 using the remote communication unit 53. The update instruction signal is in a wireless communication format as with the remote control signal SGb.

The update condition may be that the industrial vehicle remote control system 10 is newly introduced (at the initial activation), or that an update request operation is performed on the remote control device 50, for example. The update request operation may be a start operation for starting an update application in the remote control device 50, or touching on an update icon for the threshold information D1 if the operation screen G0 displays the update icon.

Figure 19:
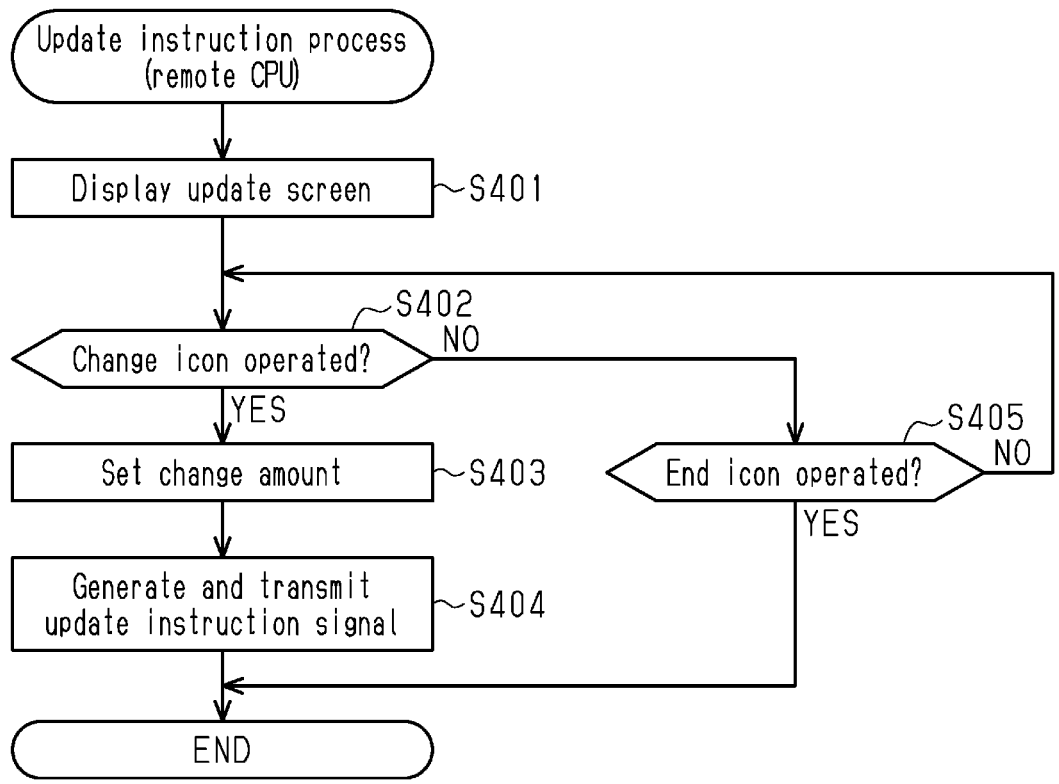
FIG. 19 is a flowchart showing an update instruction process.
Figure 20:
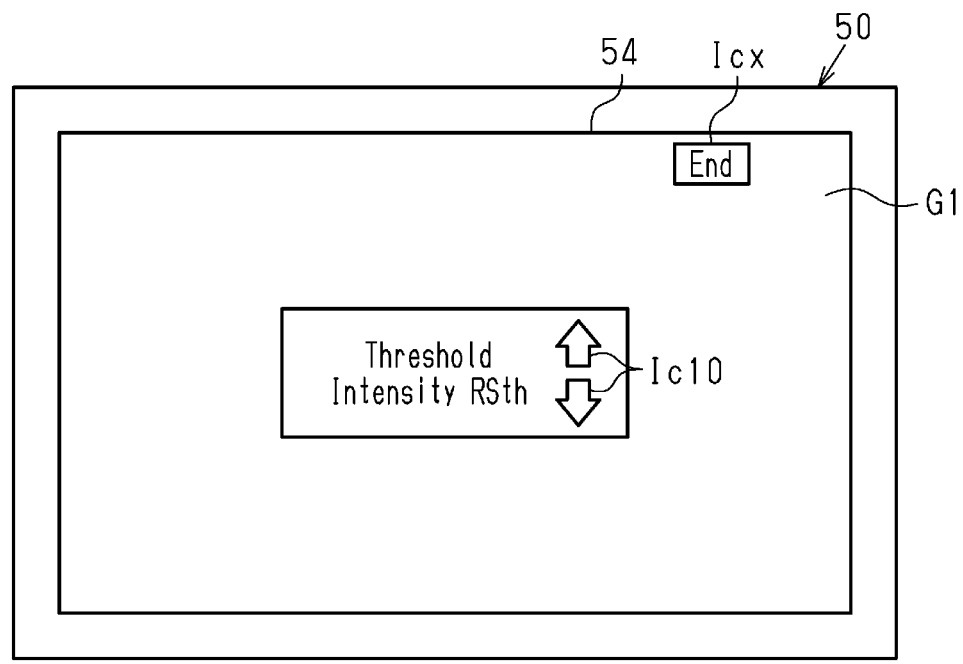
FIG. 20 is a front view showing the remote control device displaying an update screen.

Referring to FIGS. 19 and 20, the update instruction process is now described.

As shown in FIG. 19, at step S401, the remote CPU 51 displays an update screen G1 on the touch panel 54.

As shown in FIG. 20, the update screen G1 displays the threshold intensity RSth, a change icon Ic10 corresponding to the threshold intensity RSth, and an end icon Icx. This allows the operator to intuitively understand that the threshold intensity RSth is changeable by operating (touching) the change icon Ic10.

As shown in FIG. 19, at step S402, the remote CPU 51 determines whether the change icon Ic10 is operated. When detecting an operation on the change icon Ic10, the remote CPU 51 proceeds to step S403 and sets a change amount of the threshold intensity RSth. Then, at step S404, the remote CPU 51 generates an update instruction signal in which the change amount is set, transmits the generated update instruction signal to the vehicle communication unit 30 using the remote communication unit 53, and then ends this update instruction process. The vehicle communication unit 30 thus receives the update instruction signal. In this regard, the vehicle communication unit 30 may be considered as an input portion to which the update instruction signal is input.

When the change icon Ic10 is operated, the change amount of the threshold intensity RSth may be set in any specific manner. For example, the change amount may be increased or reduced by a predetermined amount each time the change icon Ic10 is touched, may be changed depending on the duration of time for which the change icon Ic10 is touched, or may be set by directly inputting a desired value. Alternatively, the remote memory 52 may store in advance a plurality of specified values that are frequently used, and the remote CPU 51 may be configured so as to allow selection of one from these specified values. Further, the change amount may be preset regardless of operation by the operator. That is, setting the change amount does not necessarily require operation by the operator.

When no operation is detected on the change icon Ic10, the remote CPU 51 proceeds to step S405 and determines whether the end icon Icx has been operated. When detecting an operation on the end icon Icx, the remote CPU 51 ends this update instruction process without transmitting an update instruction signal. When the end icon Icx has not been operated, the remote CPU 51 returns to step S402. That is, the remote CPU 51 stands by until either the change icon Ic10 or the end icon Icx is operated.

The vehicle wireless CPU 36 is configured to perform a threshold information update process, which updates the threshold information D1, when the vehicle communication unit 30 (specifically, the antennas 31 and 32) receives an update instruction signal. The threshold information storage portion 44a stores the threshold information D1 in a rewritable manner.

As shown in FIG. 18, the remote control program 40 includes a threshold information update process execution program 201 for updating the threshold information D1. When the vehicle communication unit 30 receives an update instruction signal, the vehicle wireless CPU 36 reads the threshold information update process execution program 201 and performs a threshold information update process.

In the threshold information update process, the vehicle wireless CPU 36 first acquires the change amount set in the update instruction signal that has triggered the current threshold information update process. Specifically, the vehicle wireless CPU 36 uses the signal conversion portion 33 to convert the received update instruction signal into a signal that can be acquired by the vehicle wireless CPU 36, and acquires the change amount from the converted signal. Then, the vehicle wireless CPU 36 updates the threshold information D1 stored in the threshold information storage portion 44a so that the threshold intensity RSth is changed by the change amount. The remote CPU 51, which performs the update instruction process, corresponds to an "update instruction process execution portion," and the vehicle wireless CPU 36, which performs the threshold information update process, corresponds to a "threshold information update process execution portion."

Figure 21A:
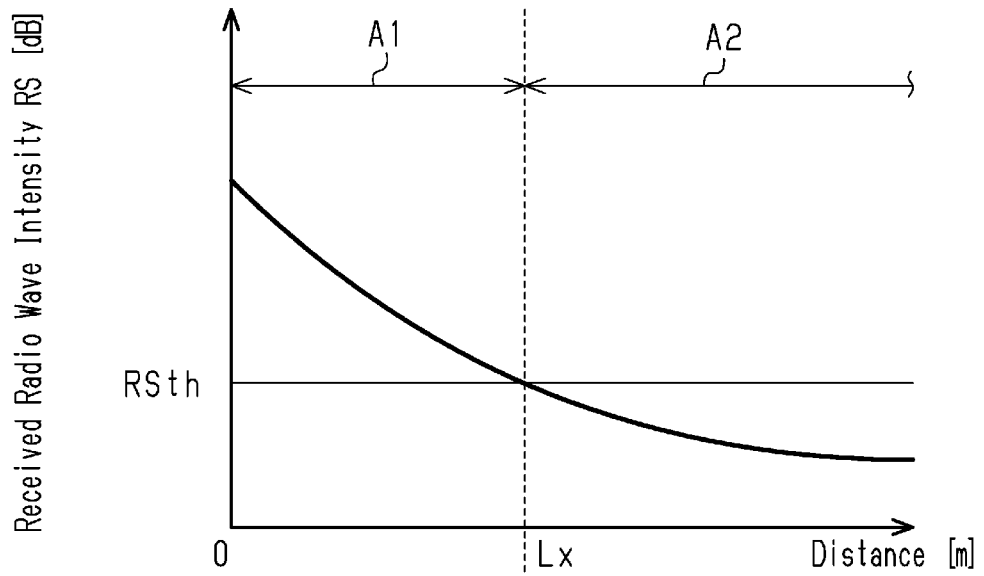
FIG. 21A is a graph indicating the relationship between the received radio wave intensity and the distance when the forklift is placed in a different environment.
Figure 21B:
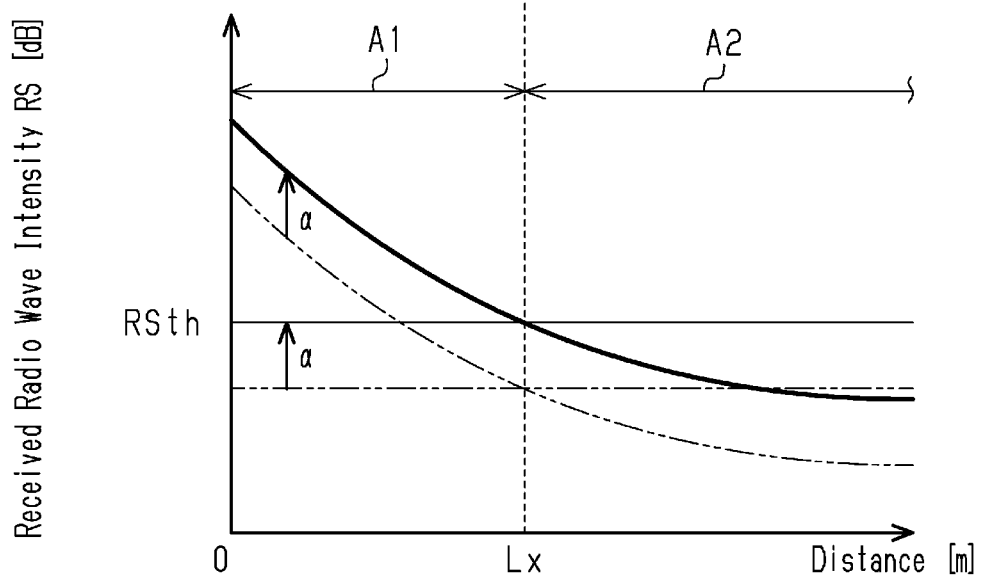
FIG. 21B is a graph indicating the relationship between the received radio wave intensity and the distance when the forklift is placed in a different environment.

A third embodiment will now be described with reference to FIG. 21. FIGS. 21A and 21B are graphs showing the change in received radio wave intensity RS with respect to the distance between the two communication units 30 and 53. The environment where the forklift 20 is placed in FIG. 21A differs from that in FIG. 21B. Each graph also shows the threshold intensity RSth, which may be updated corresponding to the change in the received radio wave intensity RS. In the following description and FIG. 21, an error in the received radio wave intensity RS and the error accommodation range A3 for accommodating an error are omitted for description purposes.

As shown in FIG. 21, the entire attenuation curve of the received radio wave intensity RS with respect to the distance between the two communication units 30 and 53 may be shifted upward or downward depending on the environment where the forklift 20 is placed. The environment where the forklift 20 is placed includes factors that affect the propagation or reflection of radio waves exchanged between the two communication units 30 and 53. For example, these factors may include the size of the site where the forklift 20 is placed and the height or the type of the material piled in the site.

If the threshold intensity RSth is fixed to a specific value, any upward or downward shift of the attenuation curve may change the upper limit of the distance used for determination regarding the permission range A1. This may reduce the accuracy of the result of possibility determination.

In this respect, the third embodiment allows the operator to adjust the threshold intensity RSth corresponding to the received radio wave intensity RS. For example, at the initial introduction or periodic maintenance of the industrial vehicle remote control system 10, the operator may update the threshold information D1 while checking the actual distance between the two communication units 30 and 53 such that the upper limit of the permission range A1 is set to the predetermined specified distance. In the environment of FIG. 21B, the received radio wave intensity RS is generally shifted upward by a shift amount a compared to the environment of FIG. 21A. Accordingly, the threshold intensity RSth is set higher by the shift amount a than the value used in the environment of FIG. 21A. This allows the upper limit of the permission range A1 to be uniform regardless of the difference of the environments where the forklift 20 is placed.

In the description on the operation above, the entire attenuation curve of the received radio wave intensity RS is shifted. However, depending on the environment where the forklift 20 is placed, the attenuation rate of the received radio wave intensity RS may vary. In this case, it is still possible to set the permission range A1 to an appropriate range by setting the threshold intensity RSth while the operator checks the distance between the two communication units 30 and 53.

In addition to the advantages of the first embodiment, the third embodiment has the following advantages.

(19) The vehicle wireless memory 35 of the forklift 20 has the threshold information storage portion 44a, which stores the threshold information D1. The vehicle wireless CPU 36 reads the threshold information D1 stored in the threshold information storage portion 44a and performs possibility determination based on the threshold intensity RSth set in the threshold information D1. The threshold information D1 is updated when a predetermined update condition is satisfied.

This configuration updates the threshold information D1 and therefore accommodates any variation in the received radio wave intensity RS that may result from the environment where the forklift 20 is placed. For example, when the attenuation curve of the received radio wave intensity RS with respect to the distance between the two communication units 30 and 53 is shifted upward or downward due to the environment where the forklift 20 is placed, the threshold information D1 is updated to adjust the threshold intensity RSth according to the shift. It is thus possible to accommodate any variation in the attenuation curve of the received radio wave intensity RS that results from the environment where the forklift 20 is placed. This reduces errors in the result of possibility determination.

(20) When the predetermined update request operation is performed on the remote control device 50, the remote CPU 51 uses the remote communication unit 53 to perform an update instruction process, which transmits an update instruction signal for instructing an update of the threshold information D1. When the vehicle communication unit 30 receives the update instruction signal, the vehicle wireless CPU 36 performs a threshold information update process, which updates the threshold information D1 stored in the threshold information storage portion 44a. This configuration updates the threshold information D1 in response to an update request operation on the remote control device 50. The use of the remote control device 50 for changing the threshold intensity RSth to a desirable value eliminates the need for arranging, in addition to the remote control device 50, a specialized device or the like for changing the threshold intensity RSth. This increases the convenience relating to the change of the threshold intensity RSth.

Fourth Embodiment

The fourth embodiment differs from the third embodiment in the structure of threshold information D2 and in that the threshold intensity RSth used in possibility determination is changed according to the remote control mode, for example. These differences are described in detail below.

Figures 22, 23:
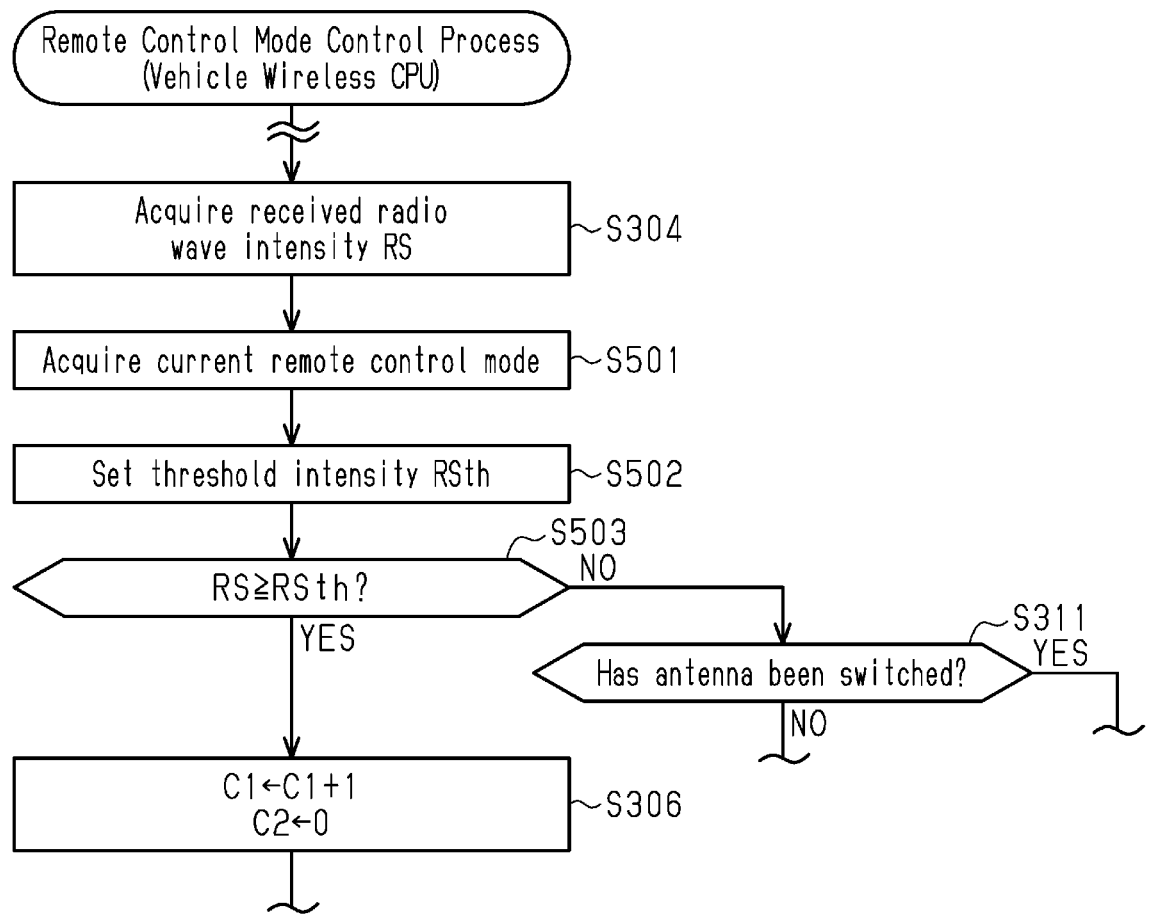
FIG. 22 is a diagram schematically illustrating the threshold information of a fourth embodiment.
FIG. 23 is a flowchart showing a part of a remote control mode control process of the fourth embodiment.

As shown in FIG. 22, in the threshold information D2, a plurality of mode thresholds RStha to RSthd is set corresponding to a plurality of remote control modes. Specifically, the threshold information D2 includes an initial mode threshold RStha, which is set corresponding to the initial mode, a permission mode threshold RSthb, which is set corresponding to the permission mode, a warning mode threshold RSthc, which is set corresponding to the warning mode, and a prohibition mode threshold RSthd, which is set corresponding to the prohibition mode.

In the fourth embodiment, the initial mode threshold RStha, the permission mode threshold RSthb, and the prohibition mode threshold RSthd are different from one another. Specifically, the initial mode threshold RStha is set higher than the permission mode threshold RSthb and the prohibition mode threshold RSthd. The prohibition mode threshold RSthd is set higher than the permission mode threshold RSthb. The warning mode threshold RSthc is identical to the permission mode threshold RSthb. That is, the fourth embodiment provides RStha>RSthd>RSthb=RSthc.

Referring to FIG. 23, the remote control mode control process of the fourth embodiment is now described.

As shown in FIG. 23, in the remote control mode control process of the fourth embodiment, the vehicle wireless CPU 36 performs the process of step S304 and then, at step S501, acquires the current remote control mode based on the remote control mode identification information.

At subsequent step S502, the vehicle wireless CPU 36 sets the threshold intensity RSth to a value corresponding to the current remote control mode. Specifically, the vehicle wireless CPU 36 refers to the threshold information D2, reads the mode threshold corresponding to the remote control mode acquired at step S501, and sets the read mode threshold as the threshold intensity RSth.

Then, at step S503, the vehicle wireless CPU 36 compares the received radio wave intensity RS acquired at step S304 with the threshold intensity RSth set at step S502.

This configuration changes the threshold intensity RSth used for possibility determination according to the current remote control mode. In this embodiment, the vehicle wireless CPU 36, which performs the processes of steps S501 and S502, corresponds to a "change portion." The processes after the process of step S503 are the same as those in the first embodiment, and thus the detailed description is omitted.

Figure 24:
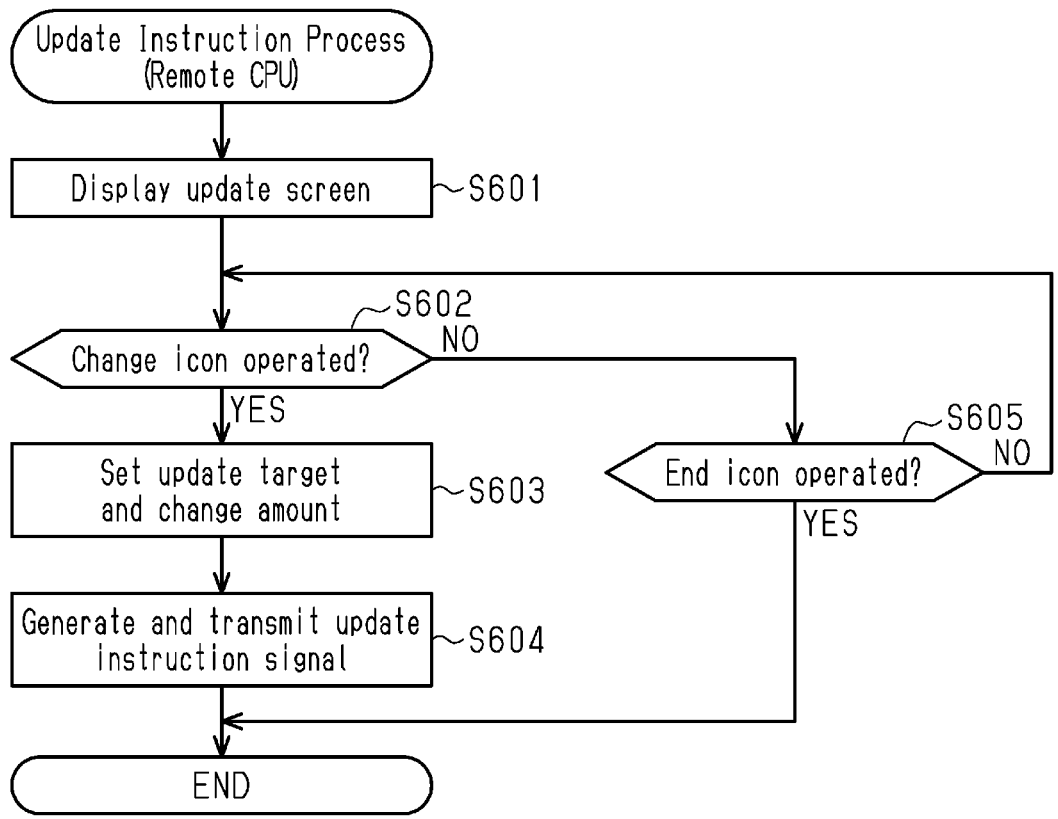
FIG. 24 is a flowchart showing an update instruction process of the fourth embodiment.
Figure 25:
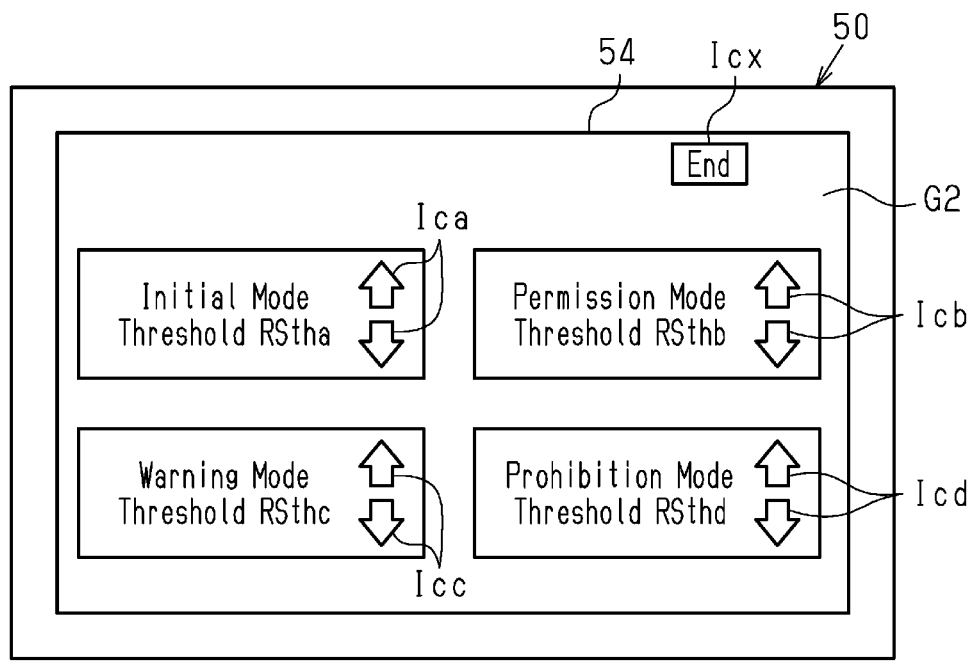
FIG. 25 is a front view showing the remote control device displaying an update screen of the fourth embodiment.

Referring to FIGS. 24 and 25, the update instruction process of the fourth embodiment is now described.

As shown in FIG. 24, at step S601, the remote CPU 51 first displays an update screen G2.

As shown in FIG. 25, the update screen G2 of the fourth embodiment displays mode thresholds RStha to RSthd, four change icons Ica to Icd corresponding to the four mode thresholds RStha to RSthd, and an end icon Icx.

As shown in FIG. 24, at steps S602 and S605, the remote CPU 51 stands by until one of the four change icons Ica to Icd or the end icon Icx is operated.

When one of the four change icons Ica to Icd is operated, the remote CPU 51 determines that the outcome at step S602 is YES, proceeds to step S603, sets, as the update target, the mode threshold corresponding to the operated change icon, and sets a change amount. Then, at step S604, the remote CPU 51 generates an update instruction signal in which the mode threshold to be updated and the change amount are set, transmits the update instruction signal to the vehicle communication unit 30 using the remote communication unit 53, and ends this update instruction process.

For example, when the change icon Icb, which corresponds to the permission mode threshold RSthb, is operated, the remote CPU 51 transmits to the vehicle wireless CPU 36 an update instruction signal in which the permission mode threshold RSthb is set as the update target and the predetermined change amount is set.

Any specific manner may be used to set the change amount of each mode threshold RStha to RSthd in response to an operation on the change icon Ica to Icd. For example, the change amount may be increased or decreased by a predetermined specified amount each time the corresponding change icon Ica to Icd is touched. Alternatively, the change amount may change depending on the duration of time for which the change icon Ica to Icd is touched. Further, a desired value may be directly input. Alternatively, the remote memory 52 may store in advance a plurality of combinations of mode thresholds RStha to RSthd that are used frequently, and the remote CPU 51 may be configured so as to allow selection of one from these combinations.

When the end icon Icx is operated, the remote CPU 51 determines that the outcome is YES at step S605 and ends the present update instruction process without transmitting an update instruction signal.

In the threshold information update process of the fourth embodiment, the vehicle wireless CPU 36 first acquires the update target and the change amount from the update instruction signal that has triggered the current threshold information update process. Specifically, the vehicle wireless CPU 36 uses the signal conversion portion 33 to convert the update instruction signal into a signal that can be acquired by the vehicle wireless CPU 36, and acquires the update target and the change amount from the converted signal. The vehicle wireless CPU 36 then updates and changes the mode threshold that is set as the update target in the threshold information D2 by the change amount.

For example, when the vehicle wireless CPU 36 receives an update instruction signal in which the permission mode threshold RSthb is set as the update target, the vehicle wireless CPU 36 updates and changes the permission mode threshold RSthb in the threshold information D2 by the change amount set in the update instruction signal. That is, upon receiving an update instruction signal, the vehicle wireless CPU 36 updates the threshold information D2 in accordance with the information set in the update instruction signal.

A fourth embodiment will now be described with reference to FIG. 26. FIGS. 26A to 26C are graphs for explaining changes in threshold intensity RSth in each remote control mode. The curves of received radio wave intensity RS in FIGS. 26A to 26C are identical.

Depending on the environment where the forklift 20 to be remotely controlled is placed, the attenuation curve of the received radio wave intensity RS with respect to the distance between the two communication units 30 and 53 can include singular points, which may be caused by reflection of radio waves or other factors. That is, the communication range A0 may include a hot spot Ay and a dead spot Ax, where the received radio wave intensity RS significantly deviates from the ideal curve.

Figure 26A:
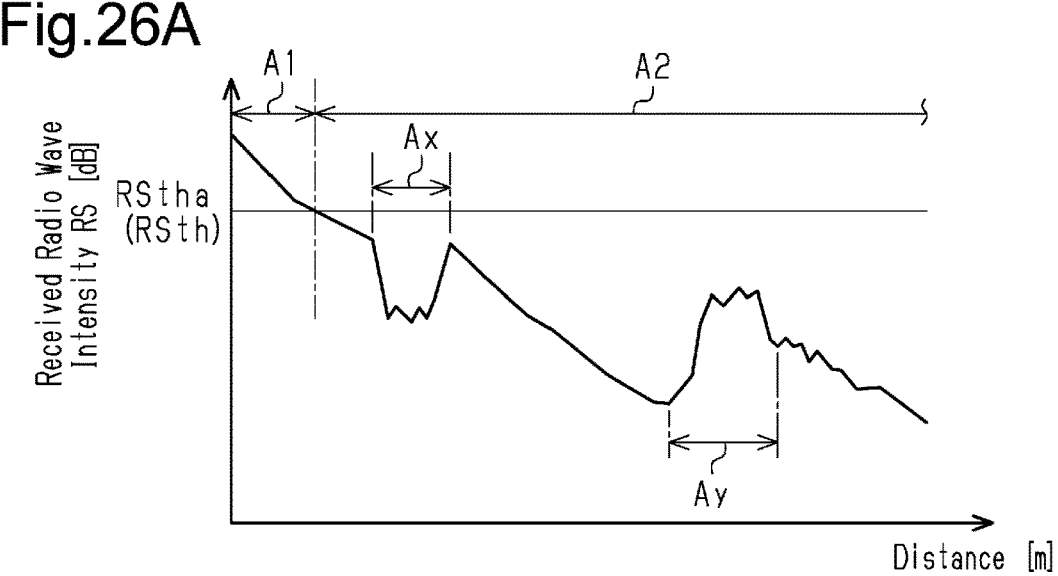
FIG. 26A is a graph showing the relationship between the change in the received radio wave intensity and the initial mode threshold in a state where a dead spot and a hot spot are created.
Figure 26B:
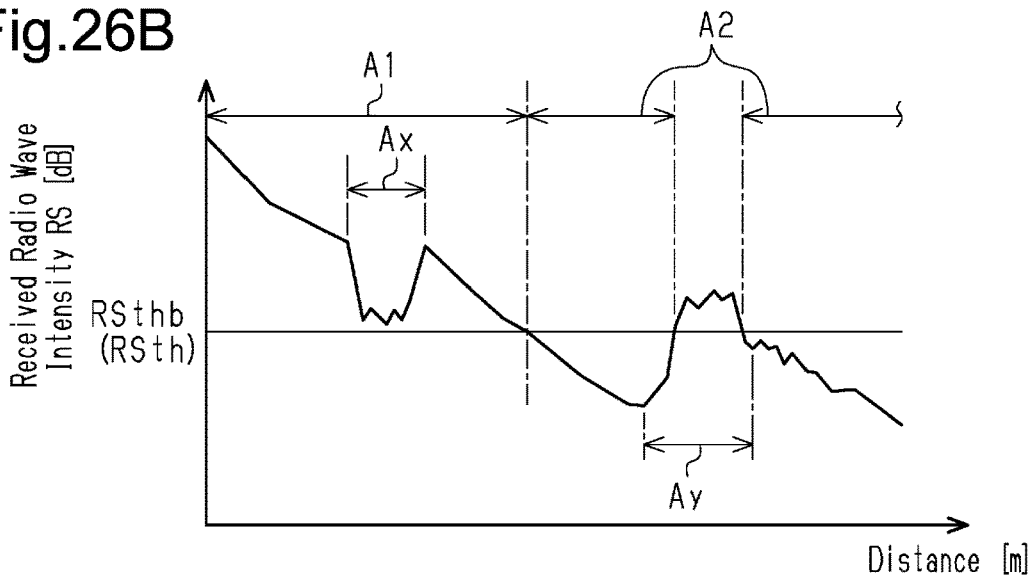
FIG. 26B is a graph showing the relationship between the change in the received radio wave intensity and the permission mode threshold in a state where a dead spot and a hot spot are created.
Figure 26C:
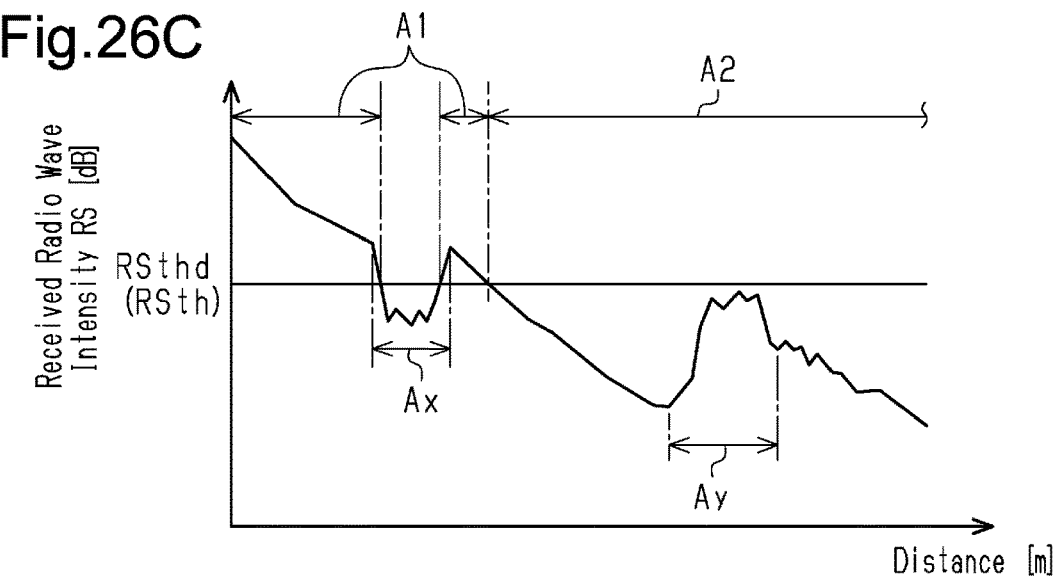
FIG. 26C is a graph showing the relationship between the change in the received radio wave intensity and the prohibition mode threshold in a state where a dead spot and a hot spot are created.

In this regard, FIGS. 26A to 26C schematically show the influences of the hot spot Ay and the dead spot Ax. As shown in FIGS. 26A to 26C, the dead spot Ax is a range in which the received radio wave intensity RS is locally lower than the estimated normal value (the ideal value), and the hot spot Ay is a range in which the received radio wave intensity RS is locally higher than the estimated normal value.

For convenience of explanation, in this example, the dead spot Ax is at a position that should be determined to be within the permission range A1. For example, the dead spot Ax is in a circle that has the remote control device 50 (specifically, the remote communication unit 53) in its center and has an radius of the first distance L1. In addition, the hot spot Ay is at a position that should be determined to be within the prohibition range A2. For example, the hot spot Ay is at a position outside a circle that has the remote control device 50 in its center and has a radius of the second distance L2. The maximum value of the received radio wave intensity RS at least in the hot spot Ay is higher than the minimum value of the received radio wave intensity RS in the dead spot Ax. Further, in the following description and FIGS. 26A to 26C, an error in the received radio wave intensity RS and the error accommodation range A3 for accommodating an error are omitted for convenience of description.

As shown in FIGS. 26A to 26C, the initial mode threshold RStha, which is set when the remote control mode is the initial mode, is set higher than the permission mode threshold RSthb and the prohibition mode threshold RSthd. For this reason, the permission range A1 in the initial mode is smaller than those in the other remote control modes.

As shown in FIGS. 26A and 26B, the permission mode threshold RSthb, which is set when the remote control mode is the permission mode, is set lower than the initial mode threshold RStha. The permission range A1 in the permission mode is thus larger than that in the initial mode.

In the fourth embodiment, the operator may set the permission mode threshold RSthb low in accordance with the local decrease in the received radio wave intensity RS in the dead spot Ax. For example, at the initial introduction or periodic maintenance of the industrial vehicle remote control system 10, the operator may perform an update instruction process such that the permission mode threshold RSthb is set lower than the received radio wave intensity RS in the dead spot Ax. The vehicle wireless CPU 36 thus performs a threshold update process, reducing the likelihood of the result of possibility determination being within the prohibition range A2 when the forklift 20 is in the dead spot Ax.

Further, as shown in FIGS. 26A and 26C, the prohibition mode threshold RSthd, which is set when the remote control mode is the prohibition mode, is set lower than the initial mode threshold RStha. The permission range A1 in the prohibition mode is thus larger than that in the initial mode.

In the fourth embodiment, the operator may set the prohibition mode threshold RSthd high in accordance with the local increase in the received radio wave intensity RS in the hot spot Ay. For example, at the initial introduction or periodic maintenance of the industrial vehicle remote control system 10, the operator may perform an update instruction process such that the prohibition mode threshold RSthd is set higher than the received radio wave intensity RS in the hot spot Ay. The vehicle wireless CPU 36 thus performs a threshold update process, reducing the likelihood of the result of possibility determination being within the permission range A1 when the forklift 20 is in the hot spot Ay.

In the fourth embodiment, the prohibition mode threshold RSthd is set higher than the permission mode threshold RSthb. Thus, the permission range A1 in the prohibition mode is smaller than the permission range A1 in the permission mode. Consequently, to switch the remote control mode from the prohibition mode to the permission mode, the operator holding the remote control device 50 needs to move closer to the forklift 20.

The fourth embodiment has the following advantages.

(21) The vehicle wireless CPU 36 performs possibility determination when the remote control mode is any of the permission mode, the warning mode, and the prohibition mode. The vehicle wireless CPU 36 performs the process of changing the threshold intensity RSth used for possibility determination according to the remote control mode (steps S501 and S502). This configuration allows the permission mode threshold RSthb, which is used for possibility determination during the permission mode, to differ from the prohibition mode threshold RSthd, which is used for possibility determination during the prohibition mode. The permission range A1 and the prohibition range A2 are thus changeable according to the remote control mode.

Changing the threshold intensity RSth according to the remote control mode limits incorrect switching of the remote control mode resulting from a local change in the received radio wave intensity RS (the spots Ax and Ay).

Specifically, depending on the environment where the forklift 20 is placed, for example, a dead spot Ax may be created at a position relatively close to the remote control device 50, or a hot spot Ay may be created at a position relatively far from the remote control device 50

In such an environment, when the forklift 20 is in the dead spot Ax while the remote control mode is the permission mode, a possibility determination result that should be within the permission range A1 can be erroneously determined to be within the prohibition range A2, causing switching of the remote control mode from the permission mode to the warning mode. In a similar manner, when the forklift 20 is in the hot spot Ay while the remote control mode is the prohibition mode, a possibility determination result that should be within the prohibition range A2 can be erroneously determined to be within the permission range A1, causing switching of the remote control mode from the prohibition mode to the permission mode. Such incorrect switching of the remote control mode can degrade the operability and safety.

In this respect, the fourth embodiment sets the permission mode threshold RSthb corresponding to the received radio wave intensity RS in the dead spot Ax to avoid erroneous determination resulting from the dead spot Ax. In addition, the fourth embodiment sets the prohibition mode threshold RSthd in accordance with the hot spot Ay to avoid erroneous determination resulting from the hot spot Ay. The spots Ax and Ay are thus unlikely to cause incorrect switching of the remote control mode.

(22) When the forklift 20 is determined to be within the permission range A1 in possibility determination performed while the remote control mode is the prohibition mode, the vehicle wireless CPU 36 switches the remote control mode from the prohibition mode to the permission mode. Since the vehicle wireless CPU 36 sets the prohibition mode threshold RSthd higher than the permission mode threshold RSthb, any hot spot Ay created in a region that should be determined to be within the prohibition range A2 is less likely to cause an incorrect possibility determination result.

The permission range A1 in the prohibition mode is more likely to be smaller than the permission range A1 in the permission mode. As such, in order to switch the remote control mode that has been switched to the prohibition mode back to the permission mode, the remote control device 50 needs to be closer to the forklift 20 than when the permission mode is active. Consequently, in order to restart remote control, the operator needs to move to a position where the operator can see the forklift 20 more clearly. This increases the safety in restarting remote control.

(23) The warning mode threshold RSthc used for possibility determination during the warning mode is identical to the permission mode threshold RSthb. That is, the vehicle wireless CPU 36 maintains the warning mode threshold RSthc, which is the threshold intensity RSth used for possibility determination during the warning mode, at the permission mode threshold RSthb used for possibility determination during the permission mode. If the warning mode threshold RSthc is identical to the prohibition mode threshold RSthd in a configuration in which the prohibition mode threshold RSthd is higher than the permission mode threshold RSthb, switching of the remote control mode from the permission mode to the warning mode would cause the permission range A1 to be smaller. This increases the likelihood that the result of possibility determination falls within the prohibition range A2 even if the operator is trying to bring the remote control device 50 and the forklift 20 closer to each other in the warning mode. As a result, the remote control mode is more likely to be switched from the warning mode to the prohibition mode, causing inconvenience.

In contrast, the fourth embodiment sets the warning mode threshold RSthc to be identical to the permission mode threshold RSthb, such that the permission range A1 is unlikely to change when the remote control mode is switched from the permission mode to the warning mode. This increases the likelihood that the result of possibility determination falls within the permission range A1 while the operator tries to bring the remote control device 50 and the forklift 20 closer to each other in the warning mode. This limits the inconvenience described above.

(24) In the initial mode set at the start of remote control, the threshold intensity RSth is set to the initial mode threshold RStha. The initial mode threshold RStha is higher than the permission mode threshold RSthb and the prohibition mode threshold RSthd. This configuration increases the safety of remote control at the start of the remote control.

Specifically, when starting remote control, it is desirable that the operator be at a position that allows the operator to adequately check the safety. In particular, since the position of the forklift 20 relative to the remote control device 50 at the start of remote control varies, a high level of safety is required.

In this respect, the fourth embodiment sets the initial mode threshold RStha high, hindering switching of the remote control mode from the initial mode to the permission mode until the operator moves to a position that enables the operator to fully ensure the safety. This brings the operator closer to the forklift 20 at the start of remote control, increasing the safety.

The above-described embodiments may be modified as follows.

In embodiments described above, when the remote control mode is the initial mode or the prohibition mode, any remote control including traveling is prohibited. However, the configuration is not limited to this, and predetermined remote control other than traveling may be permitted. That is, it is sufficient that at least remote control relating to traveling be prohibited when the remote control mode is the initial mode or the prohibition mode.

In the embodiments described above, the remote control signal SGb or the return signal SGc is used for possibility determination, but a specialized signal may be used for possibility determination.

The embodiments described above uses the common threshold intensity RSth, and the first threshold intensity, which is used for determination regarding the permission range A1, is identical to the second threshold intensity, which is used for determination regarding the prohibition range A2. However, these threshold intensities may be different from each other. For example, when the received radio wave intensity RS is less than the first threshold intensity, the vehicle wireless CPU 36 or the remote wireless CPU 101 may determine whether the received radio wave intensity RS is less than the second threshold intensity that is smaller than the first threshold intensity. When the received radio wave intensity RS is less than this second threshold intensity, the processes from step S311 may be performed. In this case, the forklift 20 is determined to be in the prohibition range A2 when a state in which the received radio wave intensity RS is less than the second threshold intensity continues for the second determination period T2. That is, the second threshold intensity may be any value less than or equal to the first threshold intensity.

When the second threshold intensity is less than the first threshold intensity, the third comparison result may be obtained in which the received radio wave intensity RS is less than the first threshold intensity and greater than or equal to the second threshold intensity. In this case, the vehicle wireless CPU 36 or the remote wireless CPU 101 may continue the possibility determination while maintaining the current remote control mode, for example. Specifically, when the third comparison result is obtained, the vehicle wireless CPU 36 or the remote wireless CPU 101 may reset the two counters C1 and C2 and end the remote control mode control process without changing the remote control mode. Further, when the third comparison result is obtained continually for a predetermined period, the vehicle wireless CPU 36 or the remote wireless CPU 101 may perform a process of indicating that the forklift 20 is in a middle range between the permission range A1 and the prohibition range A2.

The first threshold intensity and the second threshold intensity may be fixed values or variable values that are changed according to the condition. Similarly, the first determination period T1 and the second determination period T2 may be fixed values or variable values.

When the first threshold intensity is different from the second threshold intensity in the fourth embodiment, the intensities may be changed in any manner as long as the first intensity is changed according to the remote control mode and the second intensity is changed according to remote control mode. For example, the first threshold intensity in the prohibition mode may be higher than the first threshold intensity in the permission mode, and the second threshold intensity in the prohibition mode may be higher than the second threshold intensity in the permission mode. Further, at least one of the two threshold information pieces may vary according to the remote control mode.

In the first embodiment, before the process of step S304, the vehicle wireless CPU 36 may perform a smoothing process or an offset correction process of the received radio wave intensity RS. This allows the vehicle wireless CPU 36 to acquire the received radio wave intensity RS with less errors, improving the accuracy of possibility determination. The same applies to the second embodiment.

In the first embodiment, the remote communication unit 53 does not have to periodically transmit remote control signals SGb during the prohibition mode. In this case, the remote communication unit 53 may transmit a restart activation signal when restarting remote control. The vehicle wireless CPU 36 may perform possibility determination and remote control mode control based on the received radio wave intensity RS of the restart activation signal. The same applies to the second embodiment.

Each of the vehicle communication unit 30 and the remote communication unit 53, 100 may have two antennas 31 and 32.

One of the two antennas 31 and 32 may be omitted. In this case, switching of the selected antenna is unnecessary.

The specified number of times of switching of the selected antenna for each possibility determination is not limited to 1. The switching may be performed up to multiple times or freely. However, to shorten the time required for possibility determination, a smaller specified number of times such as one time is preferable.

The suspension period T3 is not limited to the period in the embodiments and may be any period longer than the determination periods T1 and T2.

The prohibition mode transition condition may be set freely. For example, the prohibition mode transition condition may be that a state in which the received radio wave intensity RS is less than a threshold that is less than the threshold intensity RSth continues for a predetermined period. Alternatively, possibility determination may be performed a predetermined number of times, and the prohibition mode transition condition may be satisfied when one of the possibility determination results is within the prohibition range A2.

The remote control mode may be indicated in any manner. For example, the remote CPU 51 may change the background color of the operation screen G0 according to the remote control mode.

The embodiments use the touch panel 54 as the indication portion. However, the indication portion may be in any form. For example, the indication portion may be a speaker or a light emitting portion. Further, the indication portion may be arranged in the forklift 20 instead of (or in addition to) the remote control device 50.

The communication system between the vehicle communication unit 30 and the remote communication unit 53, 100 is not limited to Wi-Fi and may be any system, such as Bluetooth (registered trademark) or Zigbee (registered trademark).

The error accommodation range A3 may be omitted. For example, the threshold intensity RSth may be set to the received radio wave intensity RS corresponding to the second distance L2.

The specific control for prohibiting remote control is not limited to those in the embodiments and may be any control. For example, signal conversion may be performed by the vehicle communication unit 30 regardless of the remote control mode. In this case, the vehicle CPU 27 may determine, according to the remote control mode, whether to perform control in response to the input control signal SGa.

The warning mode may be omitted. That is, when the result of possibility determination becomes within the prohibition range A2 while the remote control relating to traveling is permitted, the vehicle wireless CPU 36 may immediately prohibit the remote control relating to traveling. In other words, the prohibition range A2 may be a range that causes remote control relating to traveling to be prohibited immediately when the forklift 20 enters the prohibition range A2, or may be a range that causes remote control relating to traveling to be prohibited after a lapse of the predetermined suspension period T3.

The industrial vehicle is not limited to the forklift 20 and may be any vehicle. In addition, the industrial vehicle may have an automatic driving function of traveling in a predetermined pattern.

In the embodiments, the touch panel 54 serves as the input portion operated by the operator. However, the input portion may have any other specific configuration. For example, the remote control device 50 may include a lever for remote control. Further, the remote control device 50 may include an operation controller electrically connected by wire or wirelessly. In this case, the operation controller corresponds to the input portion.

In the first embodiment, the vehicle CPU 27 may perform the remote control mode control process and other processes. Similarly, in the second embodiment, the remote CPU 51 may perform the remote control mode control process and other processes.

In the first embodiment, the threshold intensity RSth may be set with consideration given to at least one of the dead spot Ax and the hot spot Ay. For example, the threshold intensity RSth may be set to accommodate, as an error in the received radio wave intensity RS, at least one of a decrease in the received radio wave intensity RS caused by the dead spot Ax and an increase in the received radio wave intensity RS caused by the hot spot Ay.

In the third and fourth embodiments, the update condition is that an update request operation is performed on the remote control device 50. However, the update condition is not limited to this.

For example, as shown in FIG. 27, in a configuration in which the forklift 20 includes an input portion 210 to which signals are input from the outside, the update condition may be that an update instruction signal is input to the input portion 210.

Specifically, the input portion 210 is connected to the threshold information storage portion 44a, which can be accessed directly from the outside through the input portion 210.

The threshold information D1 stored in the threshold information storage portion 44a is updated using an external controller 220 connectable to the input portion 210. Specifically, the external controller 220 has a threshold information update process execution program 221, which is used to perform a threshold information update process. The external controller 220 can access the threshold information storage portion 44a when connected to the input portion 210. The external controller 220, when connected to the input portion 210, reads the threshold information update process execution program 221 and performs a threshold information update process so as to update the threshold information D1.

That is, as long as the threshold information D1 is updatable, the forklift 20 including the threshold information storage portion 44a does not have to include a program for performing a process of updating the threshold information D1.

The input portion 210 may have any specific configuration and may be a connector or an interface, for example. Further, the input portion 210 may be an apparatus that is connectable to a server on the Internet. That is, the threshold information D1 may be updated in response to an update instruction signal transmitted from the server.

In the fourth embodiment, the permission mode threshold RSthb may be higher than the prohibition mode threshold RSthd.

In the fourth embodiment, the initial mode threshold RStha may be identical to the permission mode threshold RSthb or the prohibition mode threshold RSthd, or may be smaller than the permission mode threshold RSthb or the prohibition mode threshold RSthd. In a similar manner, the warning mode threshold RSthc may be identical to the prohibition mode threshold RSthd, or may be a value between the permission mode threshold RSthb and the prohibition mode threshold RSthd.

The subject of control for performing the update instruction process is not limited to the remote CPU 51 and may be in any form. The remote control device 50 may include an additional specialized control circuit. Likewise, the subject of control for performing the threshold information update process is not limited to the vehicle wireless CPU 36 and may be the vehicle CPU 27 or an additional specialized circuit.

The above embodiments and other modifications may be combined as appropriate. For example, the third embodiment and the fourth embodiment may be combined. Specifically, the threshold information storage portion 44a may store threshold information in which mode thresholds RStha to RSthd and a shift amount are both set. In this case, the vehicle wireless CPU 36 may set, as the threshold intensity RSth, a value obtained by adding the shift amount to the mode threshold corresponding to the remote control mode, and perform possibility determination using this threshold intensity RSth. For example, when the current remote control mode is the permission mode, the vehicle wireless CPU 36 may refer to the threshold information to read the permission mode threshold RSthb and the shift amount, and set, as the threshold intensity RSth, a value obtained by adding the shift amount to the permission mode threshold RSthb. The shift amount may be a negative value.

The industrial vehicle remote control system 10 is preferably configured such that the mode thresholds RStha to RSthd and the shift amount are updatable. For example, the remote CPU 51 may display a shift amount and a change icon for the shift amount on the update screen G2. When the change icon is operated, the remote CPU 51 may transmit an update instruction signal in which the shift amount is set as the update target. When receiving the update instruction signal, the vehicle wireless CPU 36 may update the shift amount stored in the threshold information. This accommodates an upward and downward shift of the attenuation curve of the received radio wave intensity RS due to the environment where the forklift 20 is placed, while maintaining the relative relationship between the mode thresholds RStha to RSthd.

The determination periods T1 and T2 do not have to be used in possibility determination. That is, the industrial vehicle remote control system 10 (in other words, the remote control device 50 or the forklift 20) may determine whether the forklift 20 is in the permission range A1 or in the prohibition range A2 based on the result of a single comparison between the received radio wave intensity RS and the threshold intensity RSth.

The industrial vehicle remote control system 10 may perform possibility determination using, instead of the received radio wave intensity RS, the detection result of a distance sensor that detects the distance between the remote control device 50 and the forklift 20, for example.

The technical concept of the "industrial vehicle remote control system" may be applied to the "industrial vehicle," "remote control device," "industrial vehicle remote control program," and "industrial vehicle remote control method."

The invention claimed is:
1. An industrial vehicle remote control system comprising:
   an industrial vehicle including a vehicle communication portion;
   a remote control device that includes a control device communication portion, which communicates wirelessly with the vehicle communication portion, and is used to remotely control the industrial vehicle;
   an acquisition portion configured to acquire a received radio wave intensity of a signal communicated wirelessly between the vehicle communication portion and the control device communication portion; and
   a possibility determination portion configured to perform possibility determination that
      determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period, and
      determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period,
   wherein the prohibition range is a range in which remote control relating to traveling of the industrial vehicle using the remote control device is prohibited even under conditions where wireless communication between the vehicle communication portion and the control device communication portion is performed.

2. The industrial vehicle remote control system according to claim 1, wherein
   the acquisition portion periodically acquires the received radio wave intensity at a predetermined specific interval,
   the possibility determination portion includes a comparison portion configured to compare the received radio wave intensity acquired by the acquisition portion with the first threshold intensity and the second threshold intensity each time the acquisition portion acquires the received radio wave intensity, and
   the first determination period and the second determination period are set to be at least twice as long as the specific interval.

3. The industrial vehicle remote control system according to claim 2, wherein
   the control device communication portion transmits, as the signal, a remote control signal relating to remote control to the vehicle communication portion at the specific interval, and
   the acquisition portion is located in the industrial vehicle and acquires a received radio wave intensity of the remote control signal received by the vehicle communication portion.

4. The industrial vehicle remote control system according to claim 2, wherein
   the control device communication portion transmits, as the signal, a remote control signal relating to remote control to the vehicle communication portion at the specific interval,
   upon receiving the remote control signal, the vehicle communication portion transmits a return signal to the control device communication portion, and
   the acquisition portion is located in the remote control device and acquires a received radio wave intensity of the return signal received by the control device communication portion.

5. The industrial vehicle remote control system according to claim 3, wherein the control device communication portion periodically transmits the remote control signal to the vehicle communication portion even after the industrial vehicle is determined to be in the prohibition range in the possibility determination.

6. The industrial vehicle remote control system according to claim 1, wherein
   the vehicle communication portion includes a first antenna and a second antenna,
   the industrial vehicle includes an antenna selection portion configured to select one of the first antenna and the second antenna,
   the vehicle communication portion uses a selected antenna selected by the antenna selection portion to transmit and receive the signal,
   the acquisition portion acquires a received radio wave intensity of the signal received by the selected antenna, and
   the antenna selection portion switches the selected antenna when the received radio wave intensity acquired by the acquisition portion becomes less than the second threshold intensity during the possibility determination.

7. The industrial vehicle remote control system according to claim 6, further comprising a switching prohibition portion configured to, when the selected antenna is switched a predetermined specified number of times during the possibility determination, prohibit switching of the selected antenna until the possibility determination ends.

8. The industrial vehicle remote control system according to claim 6, wherein
the industrial vehicle is a forklift including a driver seat and a roof covering the driver seat from above, and
the first antenna and the second antenna are spaced apart from each other on the roof.

9. The industrial vehicle remote control system according to claim 1, wherein
remote control modes relating to traveling of the industrial vehicle using the remote control device include:
a permission mode and a suspension mode that permit remote control relating to traveling of the industrial vehicle using the remote control device; and
a prohibition mode that prohibits remote control relating to traveling of the industrial vehicle using the remote control device even under conditions where wireless communication between the vehicle communication portion and the control device communication portion is performed,
the industrial vehicle remote control system further comprises a remote control mode control portion configured to switch the remote control mode from the permission mode to the suspension mode when the industrial vehicle is determined to be in the prohibition range in the possibility determination performed while the remote control mode is the permission mode, and
the remote control mode control portion switches the remote control mode from the suspension mode to the prohibition mode when a predetermined prohibition mode transition condition is satisfied while the remote control mode is the suspension mode, and switches the remote control mode from the suspension mode to the permission mode when a predetermined permission mode transition condition is satisfied while the remote control mode is the suspension mode.

10. The industrial vehicle remote control system according to claim 9, wherein
the possibility determination portion performs the possibility determination at least once while the remote control mode is the suspension mode, and
the permission mode transition condition includes that the industrial vehicle is determined to be in the permission range in the possibility determination performed while the remote control mode is the suspension mode.

11. The industrial vehicle remote control system according to claim 10, wherein the prohibition mode transition condition includes that a suspension period, which is longer than the first determination period and the second determination period, has elapsed without the permission mode transition condition being satisfied since the remote control mode is switched from the permission mode to the suspension mode.

12. The industrial vehicle remote control system according to claim 9, wherein the remote control device includes an indication portion configured to indicate the current remote control mode.

13. The industrial vehicle remote control system according to claim 9, wherein
the possibility determination portion performs the possibility determination when the remote control mode is any of the permission mode, the suspension mode, and the prohibition mode, and
the industrial vehicle remote control system further comprises a change portion configured to change the first threshold intensity and the second threshold intensity used in the possibility determination according to the remote control mode.

14. The industrial vehicle remote control system according to claim 13, wherein
the remote control mode control portion switches the remote control mode from the prohibition mode to the permission mode when the industrial vehicle is determined to be in the permission range in the possibility determination performed while the remote control mode is the prohibition mode, and
the change portion sets the first threshold intensity and the second threshold intensity that are used in the possibility determination during the prohibition mode to be higher than the first threshold intensity and the second threshold intensity that are used in the possibility determination during the permission mode.

15. The industrial vehicle remote control system according to claim 13, wherein the change portion maintains the first threshold intensity and the second threshold intensity that are used in the possibility determination during the suspension mode at the first threshold intensity and the second threshold intensity that are used in the possibility determination during the permission mode.

16. The industrial vehicle remote control system according to claim 1, further comprising a storage portion that stores threshold information relating to the first threshold intensity and the second threshold intensity, wherein
the possibility determination portion reads the threshold information stored in the storage portion and performs the possibility determination based on the first threshold intensity and the second threshold intensity set in the threshold information, and
the threshold information is updated when a predetermined update condition is satisfied.

17. The industrial vehicle remote control system according to claim 16, wherein
the storage portion is located in the industrial vehicle,
the update condition is that a predetermined update request operation is performed on the remote control device,
the remote control device includes an update instruction process execution portion configured to, when the update request operation is performed, perform an update instruction process, which transmits an update instruction signal instructing update of the threshold information to the vehicle communication portion using the control device communication portion, and
the industrial vehicle includes a threshold information update process execution portion configured to, when the vehicle communication portion receives the update instruction signal, perform a threshold information update process, which updates the threshold information.

18. The industrial vehicle remote control system according to claim 1, wherein the permission range is smaller than a communication range in which wireless communication between the vehicle communication portion and the control device communication portion is possible.

19. The industrial vehicle remote control system according to claim 18, wherein
a wireless communication system used between the vehicle communication portion and the control device communication portion is Wi-Fi, and
the remote control device is a mobile phone, a smartphone, a tablet terminal, or a virtual reality terminal.

20. An industrial vehicle that is remotely controlled by a remote control device that includes a control device communication portion, the industrial vehicle comprising:
a vehicle communication portion, which communicates wirelessly with the control device communication portion;
an acquisition portion configured to acquire a received radio wave intensity of a signal received by the vehicle communication portion; and
a possibility determination portion configured to perform possibility determination that
determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period, and
determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period,
wherein the prohibition range is a range in which remote control relating to traveling of the industrial vehicle using the remote control device is prohibited even under conditions where wireless communication between the vehicle communication portion and the control device communication portion is performed.

21. A remote control device used to remotely control an industrial vehicle that includes a vehicle communication portion, the remote control device comprising:
a control device communication portion, which communicates wirelessly with the vehicle communication portion;
an acquisition portion configured to acquire a received radio wave intensity of a signal received by the control device communication portion; and
a possibility determination portion configured to perform possibility determination that
determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period, and
determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period,
wherein the prohibition range is a range in which remote control relating to traveling of the industrial vehicle using the remote control device is prohibited even under conditions where wireless communication between the vehicle communication portion and the control device communication portion is performed.

22. A non-transitory computer-readable storage medium storing an industrial vehicle remote control program for remotely controlling an industrial vehicle that includes a vehicle communication portion by using a remote control device that includes a control device communication portion, which communicates wirelessly with the vehicle communication portion,
the industrial vehicle remote control program causing the industrial vehicle or the remote control device to function as:
an acquisition portion configured to acquire a received radio wave intensity of a signal communicated wirelessly between the vehicle communication portion and the control device communication portion; and
a possibility determination portion configured to perform possibility determination that
determines that the industrial vehicle is in a permission range, in which remote control relating to traveling of the industrial vehicle using the remote control device is permitted, when a state in which the received radio wave intensity acquired by the acquisition portion is greater than or equal to a predetermined first threshold intensity continues for a predetermined first determination period, and
determines that the industrial vehicle is in a prohibition range, which is farther from the remote control device than the permission range, when a state in which the received radio wave intensity acquired by the acquisition portion is less than a second threshold intensity, which is less than or equal to the first threshold intensity, continues for a predetermined second determination period,
wherein the prohibition range is a range in which remote control relating to traveling of the industrial vehicle using the remote control device is prohibited even under conditions where wireless communication between the vehicle communication portion and the control device communication portion is performed.

23. An industrial vehicle remote control method for remotely controlling an industrial vehicle including a vehicle communication portion by using a remote control device that includes a control device communication portion, which communicates wirelessly with the vehicle communication portion, the method comprising:
an acquisition step for acquiring a received radio wave intensity of a signal communicated wirelessly between the vehicle communication portion and the control device communication portion; and
a possibility determination step for performing possibility determination that
determines that the industrial vehicle is in a permission range, in which remote control relating to traveling of the industrial vehicle using the remote control device is permitted, when a state in which the received radio wave intensity acquired by the acquisition step is greater than or equal to a predetermined first threshold intensity continues for a predetermined first determination period, and
determines that the industrial vehicle is in a prohibition range, which is farther from the remote control device than the permission range, when a state in which the received radio wave intensity acquired by the acquisition step is less than a second threshold intensity, which is less than or equal to the first threshold intensity, continues for a predetermined second determination period,
wherein the prohibition range is a range in which remote control relating to traveling of the industrial vehicle using the remote control device is prohibited even under conditions where wireless communication between the vehicle communication portion and the control device communication portion is performed.

* * * * *